(12) United States Patent
Benjamin et al.

(10) Patent No.: US 9,564,972 B2
(45) Date of Patent: Feb. 7, 2017

(54) CABLE FOR RADIO FREQUENCY COMMUNICATION

(71) Applicant: Corning Optical Communications LLC, Hickory, NC (US)

(72) Inventors: Seldon David Benjamin, Painted Post, NY (US); Davide Domenico Fortusini, Ithaca, NY (US); Anthony Ng'oma, Horseheads, NY (US); Jacob George, Horeseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 108 days.

(21) Appl. No.: 14/587,201

(22) Filed: Dec. 31, 2014

(65) Prior Publication Data

US 2015/0147066 A1    May 28, 2015

Related U.S. Application Data

(63) Continuation of application No. PCT/US2013/048107, filed on Jun. 27, 2013.

(60) Provisional application No. 61/667,162, filed on Jul. 2, 2012.

(51) Int. Cl.
*H04B 10/2575* (2013.01)

(52) U.S. Cl.
CPC .. *H04B 10/25759* (2013.01); *H04B 10/25758* (2013.01)

(58) Field of Classification Search
USPC .......................................................... 398/116
See application file for complete search history.

(56) References Cited

U.S. PATENT DOCUMENTS

| | | | |
|---|---|---|---|
| 7,627,250 B2 | 12/2009 | George et al. | |
| 8,395,550 B2 | 3/2013 | Ryoo et al. | |
| 2002/0181668 A1 | 12/2002 | Masoian et al. | |
| 2007/0248358 A1 | 10/2007 | Sauer | |
| 2007/0286599 A1 | 12/2007 | Sauer et al. | |
| 2008/0080863 A1 | 4/2008 | Sauer et al. | |
| 2009/0098826 A1 | 4/2009 | Zack et al. | |

(Continued)

FOREIGN PATENT DOCUMENTS

| | | |
|---|---|---|
| EP | 2544378 A2 | 8/2011 |
| EP | 2538383 A1 | 6/2012 |

(Continued)

OTHER PUBLICATIONS

Ng'oma et al.; "21 Gbps OFDM Wireless Signal Transmission at 60 GHz Using a Simple IMDD Radio-over-Fiber System"; Optical Society of America (2010); pp. 1-3.

*Primary Examiner* — David Payne
*Assistant Examiner* — Omar S Ismail
(74) *Attorney, Agent, or Firm* — Kevin M. Able

(57) ABSTRACT

A fiber-optic based communication system for facilitating communication between a client device, such as a hand-held computing device, and a host device, such as a desktop computer, a lap-top computer, a tablet device or any other computing device. The communication system includes a cable comprising electronic devices positioned at terminal ends of an optical fiber that provides for communication between the client device and the host device, and the communication occurs via electromagnetic coupling in the near field at at least one end of the cable.

20 Claims, 17 Drawing Sheets

(56) References Cited

U.S. PATENT DOCUMENTS

| | | | |
|---|---|---|---|
| 2011/0103800 A1* | 5/2011 | Shinada | H01Q 21/0006 |
| | | | 398/116 |
| 2011/0122912 A1* | 5/2011 | Benjamin | H01S 5/4006 |
| | | | 372/50.124 |
| 2012/0134666 A1* | 5/2012 | Casterline | H04B 10/25754 |
| | | | 398/22 |
| 2012/0195329 A1* | 8/2012 | Thelen | H04B 10/25752 |
| | | | 370/480 |
| 2012/0278192 A1 | 11/2012 | Shirron et al. | |
| 2012/0282858 A1 | 11/2012 | Gill et al. | |
| 2013/0080676 A1 | 3/2013 | Mifsud et al. | |
| 2013/0089332 A1* | 4/2013 | Sauer | H04J 14/0278 |
| | | | 398/72 |
| 2013/0099006 A1 | 4/2013 | Hong et al. | |
| 2013/0099389 A1 | 4/2013 | Hong et al. | |

FOREIGN PATENT DOCUMENTS

| | | |
|---|---|---|
| WO | 01/13661 A1 | 2/2001 |
| WO | WO2008/024183 A2 | 2/2008 |
| WO | WO2012/024247 A1 | 2/2012 |
| WO | WO2012/123868 A1 | 9/2012 |
| WO | WO2013/054232 A1 | 4/2013 |

* cited by examiner

CABLE FOR RADIO FREQUENCY COMMUNICATION

PRIORITY APPLICATIONS

This application is a continuation of International Application No. PCT/US13/48107, filed on Jun. 27, 2013, which claims the benefit of priority to U.S. Application No. 61/667,162, filed on Jul. 2, 2012, both applications being incorporated herein by reference.

BACKGROUND

Field

The present disclosure relates to a near field communication system for connecting a client electronic device to a host electronic device, and more particularly wherein the near field communication system includes a fiber-optic based cable comprising at least one active electronic device positioned at a terminal end of the cable configured for near field communication with the client device.

Technical Background

Conventional communication between client devices such as cell phones and a host device such as a personal computer have utilized direct electrical contact between the devices. For example, a universal serial bus (USB) cable is plugged at one terminal end into the client device and at the other terminal end into the host unit. That is, electrical contacts in the cable connect directly with electrical contacts in the client device, while similar connections are made between the other end of the cable and the host device and current flows between the client and host device through the cable. The client device is directly electrically tethered to the host, and in most cases, the devices are locked together by way of latches on the cable or the devices.

In some instances it may be desirable to eliminate the direct physical or electrical connection, or the tethering between the client and the host. Connections via copper cables are common, but may not support high-bandwidth (>1 Gbps) applications such as HD video. In addition, electrical contacts can corrode and electrical conduction can become unreliable. Mating receptacles are also susceptible to contamination and damage and provide an opening into the portable device package for possible ingress of contaminants and moisture. On the other hand, optical data communications technologies can achieve high data rates, but the optical connections can be easily impaired by contamination.

More recently, technology has been developed that facilitates radio wave communication between client and host devices. Antennas linked to the host are positioned at predetermined locations, such as within an enclosed area such as a room, wherein the antennas broadcast a signal to form a microcell operating in the far field with an effective range measured in meters or tens of meters. For example, an antenna might be placed in a conference room that broadcasts a signal that does not extend, for practical purposes, beyond the walls of the conference room. Such distributed systems utilize electromagnetic waves in the far field, or radiation zone.

High capacity millimeter wave wireless technologies can support high-bandwidth applications such as high definition video, but require high power, high-gain antenna arrays, beam steering and other advanced techniques.

SUMMARY

A communication system having a very short range wireless connection to a client device that delivers high data-rate connectivity (>1 Gbps), is tolerant of contamination and misalignment, has either a very low power draw on the portable client device, or can serve to charge the portable device is described.

The systems, links and cables disclosed herein comprise at least one very short range interface that does not required direct electrical connection between the interfacing device (host or client) to facilitate transmission of a radio frequency (RF) signal between the device and the communication cable. As used herein, "very short range" means that the range of the wireless link can be in the near field, e.g. less than 10 cm, less than 2 cm, less than 500 µm, and in some cases less than 10 µm. The system may be designed to operate in the electromagnetic near field for example. Transmit and receive couplers (e.g. antennas) are sized appropriately for applications and devices to be associated therewith, and the frequencies of operation. For example, the near field can in some instances be considered as a distance equivalent to a thickness of an electromagnetic coupler, as described herein. Energy transfer occurs by coupling a large portion of the energy in the near field of the transmitting antenna to a receiving antenna rather than propagating most of the energy in an electromagnetic wave to the far (or radiation) field. The far field includes electromagnetic waves (e.g. radio waves and microwaves) at distances equal to or greater than about several wavelengths from most types of antennas. However, it should be understood that there is no distinct boundary between the near field and the far field.

The link formed by embodiments of the communications cable disclosed herein and host and/or client devices may be shielded from external electromagnetic interference leading to prevent interference between the wireless signals at either or both ends of the cable as well as from outside the cable. This results in secure wireless links at the ends of the cable. In addition, this allows the cable to utilize the full 7 GHz spectrum at the 60 GHz band. Furthermore, it makes the communications cable fully compatible with all wireless systems operating, for example, in the 60 GHz band. The short wireless coupling ranges and the EM shielding eliminate the possibility of multi-path effects, since transmission is line of sight only, the required digital signal processing in the transceivers is significantly simplified, leading to low power consumption.

Communication systems disclosed herein utilize optical communication between a head end unit at one terminal end of a fiber optic cable and a remote unit at the opposing terminal end of the fiber optic cable. The implementation of an optical fiber between the active components of the cable allow for a cable length that can exceed 100 meters if desired. For example, cable lengths greater than 500 meters can be easily implemented at transmission frequencies in the range of between 1 GHz and 60 GHz. The communication cable is particularly useful for communications at a frequency of 60 GHz, and includes the electronic components for baseband-to-RF modulation and RF-to-baseband demodulation The client device end of the cable (e.g. Remote Antenna Unit, RAU) may include a Reflective Electro-Absorption Modulator (R-EAM) as the electro-optical transceiver and does not include a laser for low power consumption and connector form-factor reduction. In some embodiments, the RAU does not include duplexers (e.g. optical or electrical circulators) and/or amplifiers. The device end connection employs EM coupling where the antenna is simplified to a strip line. The strip line antenna may be a traveling-wave strip line.

Connection between the host device and the communication cables disclosed herein may be baseband (direct electrical connection) or 60 GHz wireless. As used herein, a signal's baseband bandwidth is its bandwidth before modulation and multiplexing, or after demultiplexing and demodulation. In certain embodiments the optical signal is modulated at baseband.

Communication cables disclosed herein may include an electrical conductor (e.g. one or more copper wires) to deliver electrical power to head end unit or remote antenna assembly components, and in some embodiments also to a client device.

The device end (RAU) of the communication cables disclosed herein may comprise embedded magnets to provide attachment and alignment between the RAU and the client device or between the head end unit (HEU) and the host device.

In one aspect a communication link for communicating between a host device and a client device remote from the host device is disclosed comprising: at least one optical fiber comprising a first terminal end and a second terminal end; a head end unit optically coupled to the at least one optical fiber at the first terminal end, the head end unit comprising a first electro-optic converter configured to convert a received optical signal into an electrical signal or vice versa; a remote antenna assembly comprising a second electro-optic converter that converts a received optical signal into an electrical signal or vice versa; and wherein the remote antenna assembly further comprises an electromagnetic coupler configured to couple electromagnetic energy to the client device in the near field. The electromagnetic coupler may be a microstrip antenna configured to operate in the near field The communication link may include a light source configured to provide an optical carrier light to the remote antenna assembly over the at least one optical fiber and positioned in the head end assembly.

The head end unit may further comprise a duplexer, for example an electrical or optical circulator, or an optical coupler.

The head end unit may further comprise an optical modulator configured to modulate an optical carrier signal in response to a received RF electrical signal.

The head end unit may comprise an electromagnetic coupler configured to couple electromagnetic energy to the host device in the near field.

The microstrip antenna may comprise a first non-metallic substrate comprising a first surface and a second surface opposite the first surface; a metallic ground plane disposed on the first surface of the substrate, the ground plane defining an aperture extending through the ground plane; and a metallic strip positioned on the second surface of the substrate and substantially parallel with the ground plane. The aperture may be rectangular, and the metallic strip can be orthogonal with an edge of the aperture.

Alternatively, the microstrip antenna may comprise a dielectric substrate comprising a first surface and a second surface opposite the first surface; a metallic layer disposed on the first surface comprising a strip portion and a patch portion; and wherein the strip portion and the patch portion are contiguous.

In another aspect a method of forming a wireless communication system between a host device and a client device is described comprising a communication link comprising a head end unit and a remote antenna assembly, the head end unit and the remote antenna assembly being in optical communication over an optical fiber, the remote antenna assembly comprising an electromagnetic coupler configured to couple electromagnetically with the client device in the near field, positioning the client device proximate the remote antenna assembly; wirelessly receiving with the electromagnetic coupler an RF signal from the client device in the near field; receiving an optical carrier signal at the remote antenna assembly from the head end unit over the optical fiber; using the received RF signal to RF modulate the optical carrier signal at the remote antenna assembly, optically transmitting the RF modulated optical carrier signal over the optical fiber to the head end assembly; converting the RF modulated optical carrier signal to an RF electrical signal; and transmitting the RF electrical signal to the host device.

The wirelessly receiving can include electromagnetic coupling between the client device and the first transceiver assembly in the electromagnetic near field. The electromagnetic coupler may comprise: a first non-metallic substrate comprising a first surface and a second surface opposite the first surface; a metallic ground plane disposed on the first surface of the substrate, the ground plane defining an aperture extending through the ground plane; and a metallic strip positioned on the second surface of the substrate and orthogonal to the aperture.

The remote antenna assembly may comprise: a dielectric substrate comprising a first surface and a second surface opposite the first surface; a metallic layer disposed on the first surface comprising a strip portion and a patch portion; and wherein the strip portion and the patch portion are contiguous.

The remote antenna assembly may further comprise a reflective electro-absorption modulator.

The remote antenna assembly may comprise an electrical circulator.

In yet another aspect a communication cable for communicating between a host device and a client device remote from the host device is disclosed comprising: an optical fiber comprising a first terminal end and a second terminal end; a head end unit optically coupled to the optical fiber at the first terminal end, the head end unit comprising a first electro-optic converter configured to convert a received optical signal into an electrical signal or vice versa; a remote antenna assembly comprising a second electro-optic converter that converts a received optical signal into an electrical signal or vice versa, and further comprising an electromagnetic coupler configured to operate at RF frequencies in the near field; and wherein a light source configured to provide an optical carrier light to the second electro-optic converter in the remote antenna assembly is positioned in the head end assembly.

The second electro-optic converter may be a reflective electro-absorption modulator.

The remote antenna assembly may comprise a microstrip antenna.

The microstrip antenna can comprise a first substrate including a conductive ground plane disposed on a first side, and a conductive strip disposed on a second side opposite the first side, and wherein the conductive ground plane comprises an aperture therethrough, the aperture positioned opposite the conductive strip such that a long dimension of the conductive strip is perpendicular to a long dimension of the aperture.

The remote antenna assembly can include at least one magnet for removably coupling the remote antenna assembly, and the communications cable, magnetically with a client device.

Additional features and advantages of the embodiments disclosed herein will be set forth in the detailed description which follows, and in part will be readily apparent to those skilled in the art from that description or recognized by practicing the embodiments as described herein, including the detailed description which follows, the claims, as well as the appended drawings.

DETAILED DESCRIPTION

Figure 1:
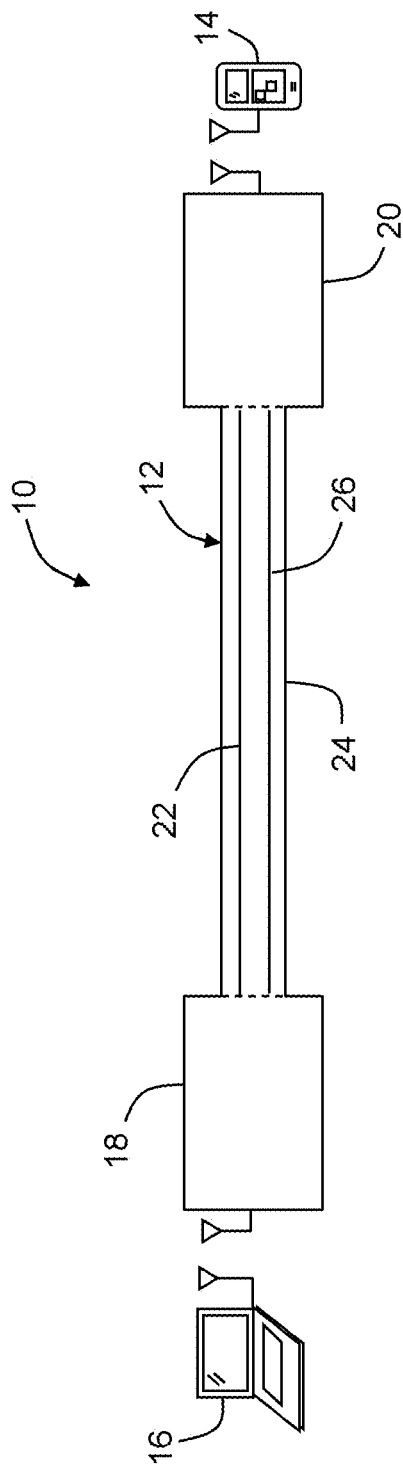
FIG. 1 is a schematic diagram of an optical fiber-based communication cable shown connecting a host device to a client device via radio frequency transmission.

In the following detailed description, for purposes of explanation and not limitation, example embodiments disclosing specific details are set forth to provide a thorough understanding of the present disclosure. However, it will be apparent to one having ordinary skill in the art, having had the benefit of the present disclosure that embodiments disclosed herein may be practiced in part or in whole within still other embodiments that depart from the specific details disclosed herein. Moreover, descriptions of well-known devices, methods and materials may be omitted so as not to obscure the present description. Finally, wherever applicable, like reference numerals refer to like elements.

Shown in FIG. 1 is an embodiment of a high data-rate wireless radio frequency (RF) communication system 10. While radio frequencies can extend over broad frequency ranges, as used herein RF is intended to mean within a frequency range generally extending between about 1 GHz and about 100 GHz, for example between about 10 GHz and about 100 GHz, between about 20 GHz and about 100 GHz, between about 30 GHz and about 100 GHz, between about 40 GHz and about 100 GHz, between about 50 GHz and about 100 GHz or between about 60 GHz and about 100 GHz. In accordance with the present embodiment, RF communication system 10 comprises an electro-optical cable 12 coupling an electronic client device 14 to an electronic host device 16. Client device 14 may be, for example, a portable electronic device such as a handheld device, including without limitation a cellphone (e.g. smartphone) or a tablet computing device. Host device 16 may comprise, for example, a communication network device or a computing device (e.g. desktop, laptop or mainframe computer). In some examples, electro-optical cable 12 may be configured to operate at a data rate equal to or greater than about 60 Gbps.

Electro-optical cable 12 comprises a head end unit (HEU) 18 positioned at a first terminal end of the cable and a remote antenna unit (RAU) 20 positioned at a second terminal end of the cable. At least one optical fiber 22 extends between and connects the head end unit and the remote antenna unit and provides for optical communication between HEU 18 and RAU 20. The at least one optical fiber 22 may be a single-mode optical fiber, but can, in other embodiments, be a multimode optical fiber. Electro-optical cable 12 may also include an external cable jacket 24 disposed over the at least one optical fiber 22 (see FIG. 2). The cable jacket may be formed from a polymeric material that affords mechanical protection to the optical fiber contained within the jacket. Electro-optical cable 12 may contain only a single optical fiber, or electro-optical cable 12 may contain a plurality of optical fibers. Electro-optical cable 12 may further include an electrical conductor 26, such as a metallic wire (e.g. copper), that extends between the HEU 18 and the RAU 20 and may be contained within cable jacket 24. Electrical conductor 26 may, for example, be used to distribute electrical power from host device 16 to electrical or electronic components housed within HEU 18 and/or RAU 20, but may also, in some embodiments, be used to distribute electrical power to electronic client device 14. Electro-optical cable 12 may in some embodiments be a unitary structure that is light weight and portable. By unitary structure what is meant is that the optical fiber(s), the cable jacket, the HEU 18 and the RAU 20 are of a self-contained (stand-alone) design, forming a patch cord that is easily transported. For example, the cable according to embodiments disclosed herein may be easily transported in a person's pocket. Electro-optical cable 12 may in some embodiments be less than a meter in length, while in other embodiments electro-optical cable 12 may extend to one or more tens of meters in length, e.g. equal to or greater than about 10 meters in length or equal to or greater than about 20 meters in length. The length of electro-optical cable 12 is limited only by the ability to generate sufficient optical power to transmit GHz frequency signals over the at least one optical fiber 22. However, it should be emphasized that in each of the embodiments described herein the electro-optical cable components represented by reference numerals 18, 20 and 22 (or their other variations and embodiments as may be described) need not be assembled as a unitary structure.

Figure 2:
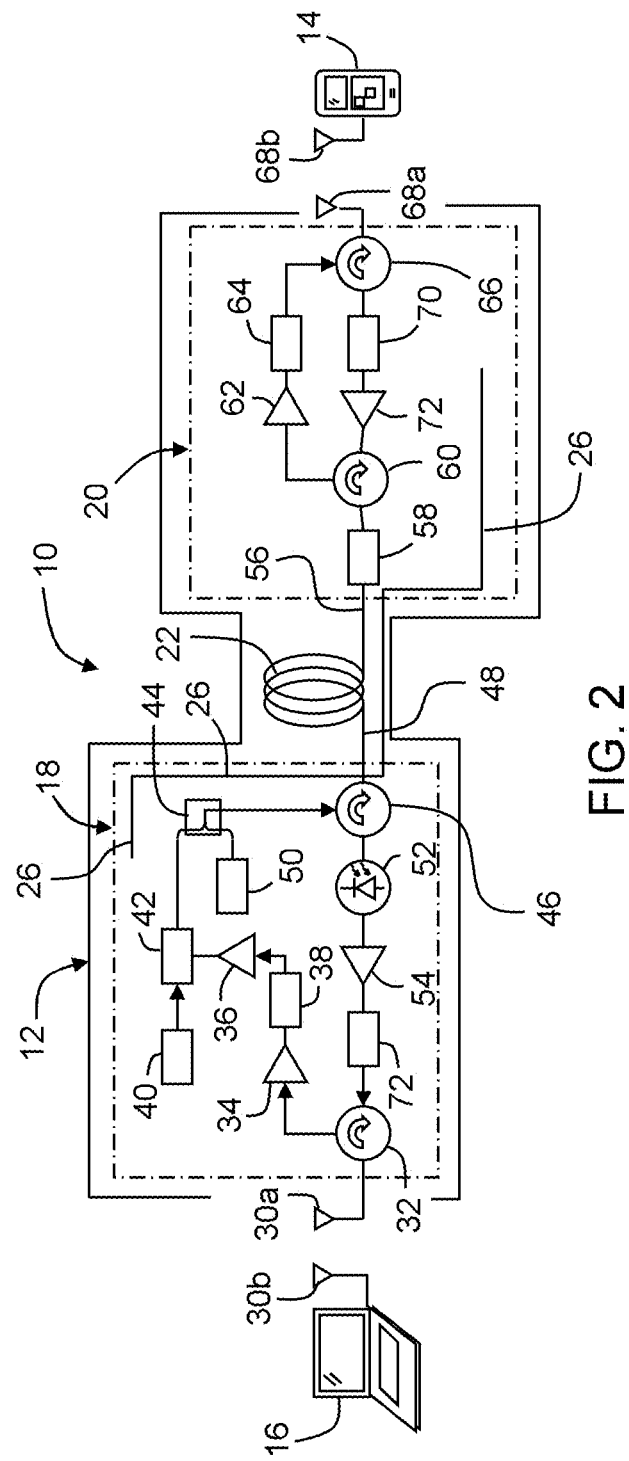
FIG. 2 is a detailed schematic diagram of the communication cable of FIG. 1.
Figure 3:
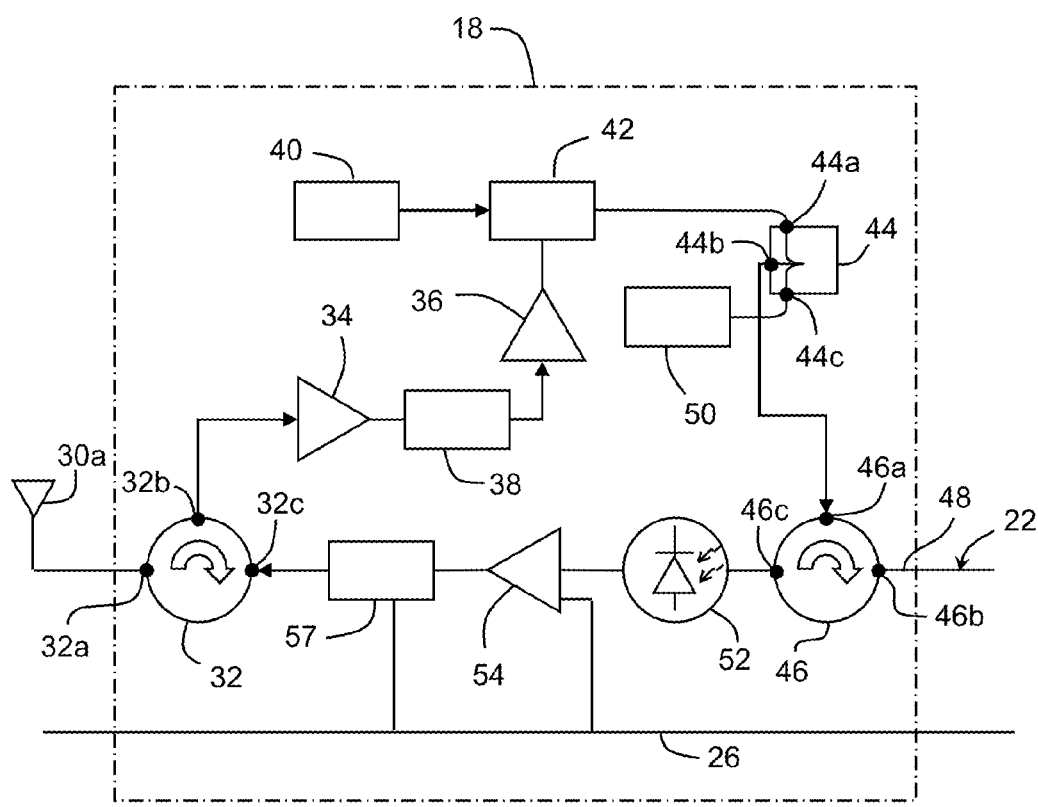
FIG. 3 is a detailed schematic diagram of the HEU of the communication cable of FIGS. 1 and 2.

Referring now to FIGS. 2-3, in one embodiment HEU 18 is an active electronic unit that performs an electrical-to-optical (E/O) signal conversion and/or an optical-to-electrical (O/E) signal conversion, and which head end unit is configured to transmit and/or receive an electrical signal electromagnetically, such as through radio-frequency (RF) waves. HEU 18 may further be configured to process the signal, such as by removing electronic noise and/or amplifying the signal. In the instant embodiment, HEU 18 comprises short range antenna 30a that transmits and/or receives a modulated radio-frequency signal to and/or from electronic host device 16 in the near field through a corresponding short range antenna 30b located within electronic host device 16. HEU 18 is configured to transmit and receive electromagnetic radiation over short distances in the electromagnetic near field, which can be at a distance equal to or less than about 10 cm, equal to or less than about 5 cm, and even equal to or less than about 2 cm, wherein such distances are, inter alia, a function of frequency. However, transmission distances as described herein can be on the order of several wavelengths of the transmission carrier wave. For example, greater than about 2 wavelengths. The short transmission distance enables the power requirements of the HEU to be quite small.

Still referring to FIGS. 2-3, HEU 18 further comprises a duplexer 32, e.g. a multiport HEU electrical circulator 32, comprising first, second and third ports 32a, 32b and 32c respectively. First port 32a of HEU electrical circulator 32 is electrically coupled to HEU short range antenna 30a. As used herein, "electrically coupled" means a direct electrical connection. Second port 32b of HEU electrical circulator 32 is electrically coupled to first HEU amplifier 34. First HEU amplifier 34 is, in turn, electrically coupled to second HEU amplifier 36 through first HEU bandpass filter 38. Second HEU amplifier 36 is configured to modulate an optical output of first HEU laser 40 through HEU modulator 42, and is electrically coupled to HEU modulator 42. When the at least one optical fiber 22 is a single-mode optical fiber, first HEU laser 40 may be a single-mode laser. When the at least one optical fiber 22 is a multimode optical fiber, first HEU laser 40 may be a single-mode laser or a multimode laser. First HEU laser 40 may comprise, for example, a vertical cavity surface emitting laser (VCSEL) diode.

HEU 18 further comprises multiport HEU optical coupler 44 comprising first, second and third ports 44a, 44b and 44c respectively, and a duplexer, such as HEU optical circulator 46 comprising first, second and third ports 46a, 46b and 46c, respectively. The output of HEU modulator 42 is optically coupled to first port 44a of HEU optical coupler 44. Second port 44b of HEU optical coupler 44 is optically coupled to first port 46a of HEU optical circulator 46. In turn, second port 46b of HEU optical circulator 46 is optically coupled to first end 48 of the at least one optical fiber 22. Third port 44c of multiport HEU optical coupler 44 is optically coupled to second HEU laser diode 50. Second HEU laser 50 may be, for example, a vertical cavity surface emitting laser (VCSEL) diode. Third port 46c of HEU optical circulator 46 is optically coupled to HEU photodetector 52 that is electrically coupled to third HEU amplifier 54. The output of third HEU amplifier 54 is electrically coupled to third port 32c of HEU electrical circulator 32 through second HEU bandpass filter 57.

Figure 4:
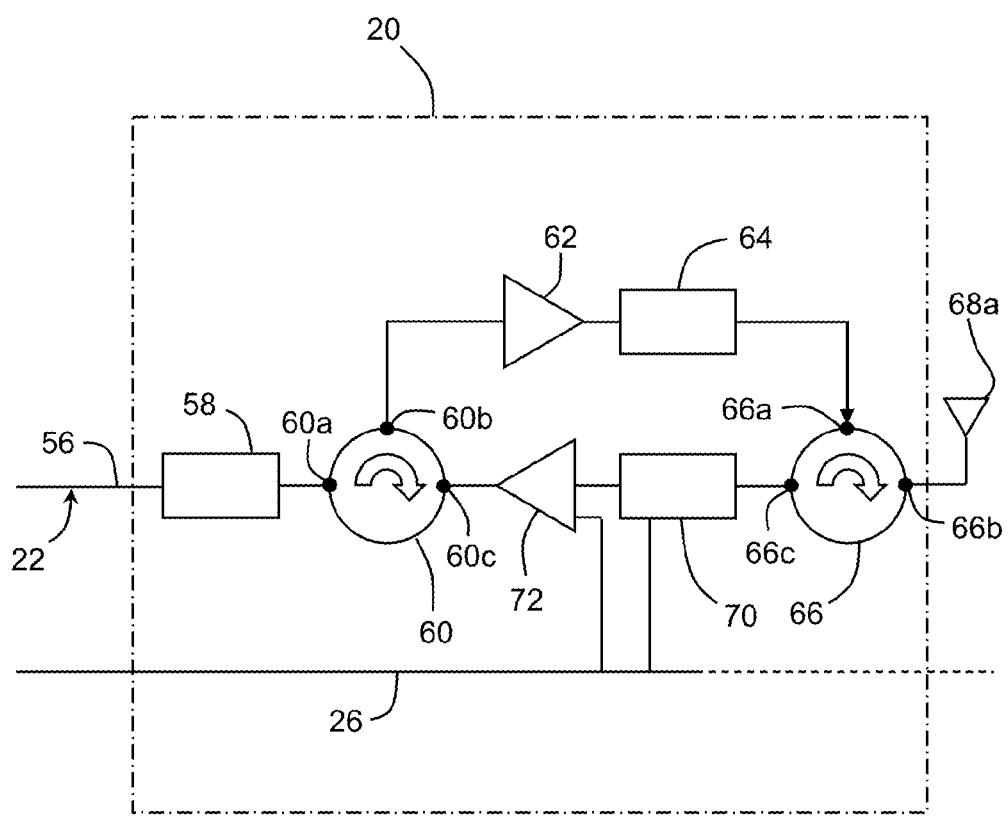
FIG. 4 is a detailed schematic diagram of the remote antenna unit (RAU) of the communication cable of FIGS. 1 and 2.

Referring now to FIGS. 2 and 4, RAU 20 is an active electronic unit that performs an electrical-to-optical (E/O) signal conversion and/or an optical-to-electrical (O/E) signal conversion, and which active electronic unit is configured to transmit and/or receive an electrical signal electromagnetically, such as through radio-frequency waves, through a self-contained antenna and a corresponding antenna comprising client device 14. RAU 20 comprises reflective electro-absorption modulator (R-EAM) 58. R-EAM 58 may be used both as an optical-to-electrical converter for the downlink signal (host to client device communication) as well as an optical amplitude modulator for the uplink (client to host device communication). Accordingly, for uplink communication, the R-EAM functions essentially as an electrical-to-optical converter. RAU 20 further comprises a first duplexer, e.g. RAU electrical circulator 60 comprising first, second and third ports 60a, 60b and 60c, respectively. Second end 56 of the at least one optical fiber 22 is optically coupled to the reflective, electro-absorption modulator (R-EAM) 58, which in turn is electrically coupled to first port 60a of first RAU electrical circulator 60. Second port 60b of first RAU circulator 60 is electrically coupled to first RAU amplifier 62, which in turn is electrically coupled to first RAU bandpass filter 64.

RAU 20 further comprises a second duplexer, e.g. RAU electrical circulator 66 comprising first, second and third ports 66a, 66b and 66c, respectively. The output of first RAU bandpass filter 64 is electrically coupled to first port 66a of second RAU electrical circulator 66. Second port 66b of second RAU electrical circulator 66 is electrically coupled to RAU short range antenna 68a configured to transmit or receive electromagnetic radiation in the near field at distances typically on the order of equal to or less than 10 cm, equal to or less than 5 cm, and even equal to or less than 2 cm. In addition, third port 66c of second RAU electrical circulator 66 is electrically coupled to the input of second RAU bandpass filter 70. The output of second RAU bandpass filter 70 is in turn electrically coupled to third port 60c of first RAU electrical circulator 60 through second RAU amplifier 72.

FIGS. 2-4 further illustrate electrical conductor 26 extending between, and inclusive with, HEU 18 and RAU 20. To simplify FIG. 2, electrical conductor 26 is shown unconnected to components within HEU 18 or RAU 20. However, it should be noted that electrical conductor 26 may be connected to any component within HEU 18 or RAU 20 requiring electrical power. For example, electrical conductor 26 may serve as an electrical supply line from which electrical or electronic components within HEU 18 and/or RAU 20 may be electrically coupled. Electrical conductor 26 may be energized via direct electrical contact with one or more components of host 16 and/or client device 14, or electrical conductor 26 may be energized electromagnetically (wirelessly) without the need for direct physical contact between conductors. For example, an electrical coil within host 16 can be used to develop an electromagnetic field that energizes a corresponding electrical coil within HEU 18 (not shown), wherein the electrical coil within HEU 18 is in electrical communication with electrical conductor 26. DC current can be developed within HEU 18 using suitable rectifier circuitry. In other embodiments, near field power transmission can be utilized. For simplicity, FIGS. 3 and 4 illustrate electrical conductor 26 connected to selected components within HEU 18 and RAU 20. However, electrical conductor 26 may be in electrical communication with any one or more components within HEU 18 or RAU 20 that require electrical power. In addition, electrical connector 26 can be placed into direct electrical communication with client device 14 so that client device 14 can be recharged or powered by host device 16 through electrical conductor 26 or RAU 20 may be configured to provide electrical power to client device 14 via wireless power transmission.

In one example, where information is to be communicated from host device 16 to client device 14, host device 16, such as a computer, generates a radio frequency signal that is routed to an antenna 30b that is in proximity (within the electromagnetic near field) to HEU antenna 30a so that a corresponding RF signal is generated in HEU antenna 30a. The RF signal generated at HEU antenna 30a is directed to first port 32a of HEU electrical circulator 32, wherein HEU electrical circulator 32 routes the RF signal to first HEU amplifier 34 through the second port 32b of HEU electrical circulator 32. The RF signal is amplified by first HEU amplifier 34 and then filtered by first HEU bandpass filter 38 to remove electrical noise. The output of first HEU bandpass filter 38 is transmitted to second HEU amplifier 36. Second HEU amplifier 36 is a driver amplifier that is electrically connected to HEU modulator 42. HEU modulator 42 receives an optical carrier light from first HEU laser 40, the optical carrier light being amplitude modulated by HEU modulator 42, thereby converting the electrical RF signal to an optical RF signal. The optical RF signal from HEU modulator 42 is received by multiport HEU optical coupler 44 through first port 44a HEU optical coupler 44 and then directed to first port 66a of HEU optical circulator 46 and then to the at least one optical fiber 22, where the optical RF signal is transmitted to RAU 20.

At RAU 20 the optical RF signal transmitted through optical fiber 22 is received by reflective electro-absorption modulator (R-EAM) 58. R-EAM 58 converts the optical RF signal to an electrical RF signal and directs the electrical RF signal to first port 60a of first RAU electrical circulator 60. From first RAU electrical circulator 60 the electrical RF signal is directed through second port 60b of RAU electrical circulator 60 to first RAU amplifier 62, then to first RAU bandpass filter 64, followed by second RAU electrical circulator 66 through first port 66a. Second RAU electrical circulator 66 in turn directs the electrical RF signal through second port 66b to RAU short range antenna 68a that is in electromagnetic communication with a corresponding short range antenna 68b within portable device 16.

For communication from client device 14 to host device 16, the signal transition proceeds as follows. An electrical RF signal generated by client device 14 is received by antenna 68b within client device 14 that transmits the electrical RF signal to RAU short range antenna 68a. The electrical RF signal generated within RAU short range antenna 68a is routed to second port 66b of second RAU electrical circulator 66. Second RAU electrical circulator 66 then directs the electrical RF signal from port 66c to second RAU bandpass filter 70 which subsequently directs the electrical RF signal to second RAU amplifier 72. Second RAU amplifier 72 in turn feeds the electrical RF signal to third port 60c of first RAU electrical circulator 60, where the electrical RF signal is directed to R-EAM 58. In the meantime, second HEU laser diode 50 generates a second optical carrier light that is routed through second and third ports 44b and 44c of multiport HEU coupler 44, respectively, and then to the at least one optical fiber 22 through HEU optical circulator ports 46a and 46b. The second optical carrier light arrives via the at least one optical fiber 22 at R-EAM 58. R-EAM 58 modulates the second optical carrier light according to the RF signal received from second RAU amplifier 72, and reflects the now RF modulated second optical carrier light to second port 46b of HEU optical circulator 46. The RF-modulated second optical carrier light is directed to HEU photodiode 52 by HEU optical circulator 46 through third port 46c and converted to an RF electrical signal by HEU photodiode 52. The RF electrical signal is received from HEU photodiode 52 by third HEU amplifier 54 and directed to third port 32c of HEU electrical circulator 32 through second HEU bandpass filter 57. From HEU electrical circulator 32 the RF signal is directed through first port 32a to HEU antenna 30a where the RF signal is transmitted to short range antenna 30b comprising host device 16.

While the preceding transmission/reception route described above is conveyed in terms of near field transmission, transmission over longer distances in the far field is also possible by selecting appropriate antenna.

Figure 5:
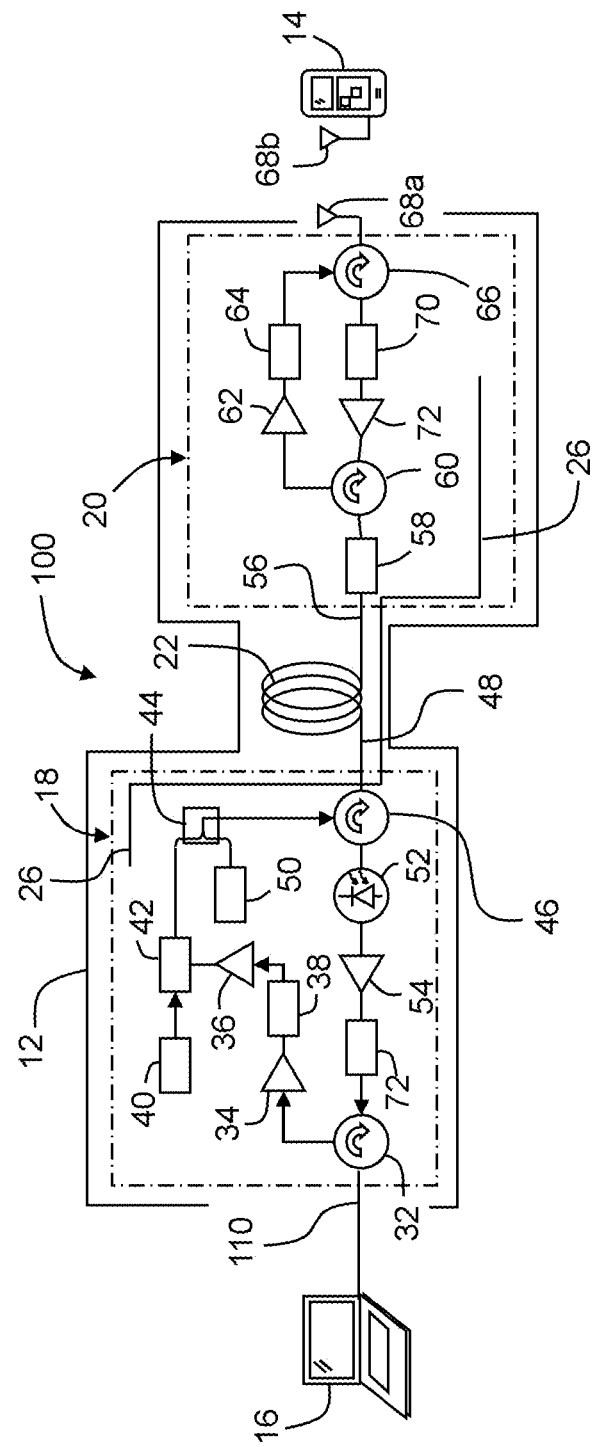
FIG. 5 is a detailed schematic diagram of another embodiment of a communication cable disclosed herein.

FIG. 5 illustrates another embodiment of a communication system 100 similar to the communication system 10 shown in FIG. 2 except that antennas 30a and 30b are replaced by a physical-contact electrical connection between host device 16 and HEU 18. For example, both host device 16 and HEU 18 may comprise electrical contacts residing within mating connectors (not shown), which, when mated, produce contact between a signal line within the host device and electrical signal line 110 within HEU 18. When the electrical contacts of host device 16 are brought into mechanical contact with the electrical contacts of HEU 18, a direct electrical RF signal connection is formed between host device 16 and first HEU circulator 32, as represented by electrical signal line 110. With the exception of transmission between host device 16 and HEU 18, operation of communication system 100 (and electro-optical cable 12) occurs as described for the preceding embodiment.

Figure 6:
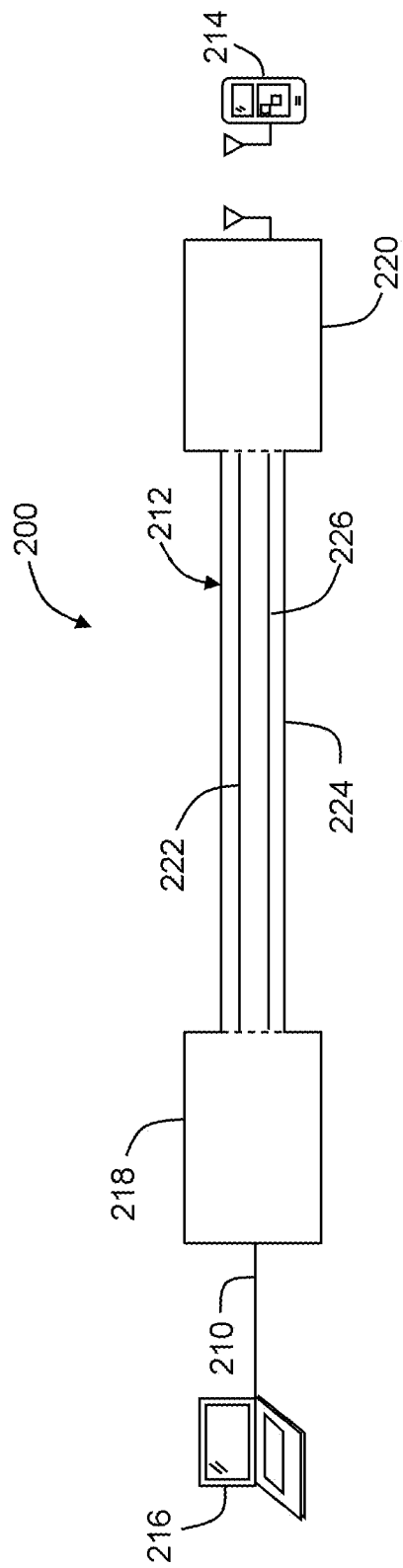
FIG. 6 is a schematic diagram of an optical fiber-based communication cable shown connecting a host device to a client device.
Figure 7:
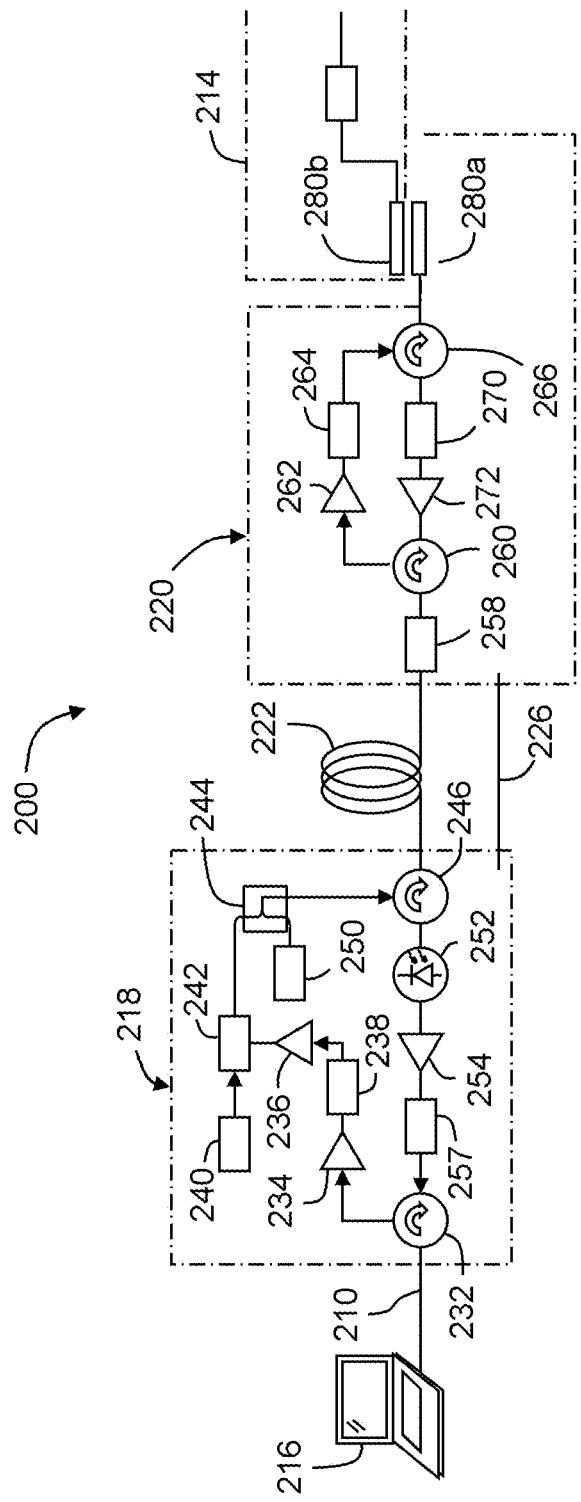
FIG. 7 is a detailed schematic diagram of the communication cable of FIG. 6.

Shown in FIGS. 6-7 is an embodiment of a high data-rate communications system 200 comprising electro-optical cable 212 that couples an electronic client device 214 to an electronic host device 216. Client device 214 may be, for example, a portable electronic device such as a handheld device, including without limitation a cellphone or a tablet computing device. Host device 216 may comprise, for example, a communication network device, or a computing device such as a desktop computer, laptop computer or a mainframe computer.

Electro-optical cable 212 comprises a head end unit (HEU) 218 positioned at a first terminal end of the cable and a remote antenna unit (RAU) 220 positioned at a second terminal end of the cable. At least one optical fiber 222 extends between HEU 218 and RAU 220, and provides for optical communication between HEU 218 and RAU 220. However, multiple optical fibers may be employed within electro-optical cable 212. The at least one optical fiber 222 may be a single-mode optical fiber, but may, in some embodiments, be a multimode optical fiber. Cable 212 may also include an external cable jacket 224 disposed over at least the at least one optical fiber (see FIG. 2). The cable jacket may be formed from a polymeric material that affords mechanical protection to the at least one optical fiber contained within the jacket. Cable 212 may further include an electrical conductor 226, such as a metallic wire (e.g. copper), that extends between the HEU 218 and the RAU 220 and which may be contained within cable jacket 224. Electrical conductor 226 may, for example, be used distribute electrical power to electrical or electronic components housed within HEU 218 and/or RAU 220, but may also, in some embodiments, be used to distribute electrical power to electronic client device 214, either electromagnetically (wirelessly) or via a direct electrical connection as previously described.

Figure 8:
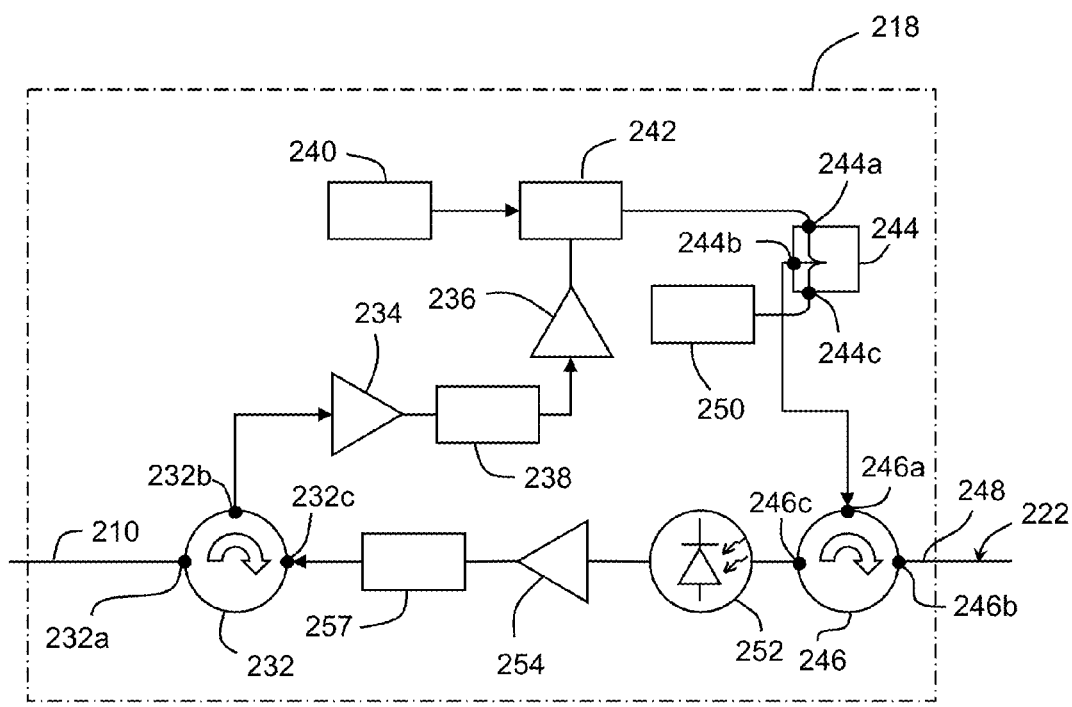
FIG. 8 is a detailed schematic diagram of the head end unit (HEU) of the communication cable of FIG. 6.

Referring to FIGS. 7-8, HEU 218 comprises a duplexer, such as first multiport HEU electrical circulator 232 comprising first, second and third ports 232a, 232b and 232c respectively. First port 232a of first HEU electrical circulator 232 is electrically coupled to host device 216 through electrical signal line 210. Host device 216 may be directly electrically coupled to HEU 218 via a connector for example. Second port 232b of first HEU electrical circulator 232 is electrically coupled to first HEU amplifier 234. First HEU amplifier 234 is, in turn, electrically coupled to second HEU amplifier 236 through first HEU bandpass filter 238. Second HEU amplifier 236 is configured to modulate an optical output of first HEU laser diode 240 via HEU modulator 242 and is electrically coupled to HEU modulator 242. When the at least one optical fiber 222 is a single-mode optical fiber, first HEU laser 240 may be a single-mode laser. When the at least one optical fiber 222 is a multimode optical fiber, first HEU laser 240 may be a single-mode laser or a multimode laser. First HEU laser 240 may be, for example, a vertical cavity surface emitting laser (VCSEL) diode.

HEU 218 may further comprise a second duplexer, e.g. multiport HEU optical coupler 244 comprising first, second and third ports 244a, 244b and 244c respectively, and a third duplexer, e.g. second HEU optical circulator 246 comprising first, second and third ports 246a, 246b and 246c, respectively. The output of HEU modulator 242 is optically coupled to first port 244a of HEU optical coupler 244. Second port 244b of HEU optical coupler 244 is optically coupled to first port 246a of second HEU optical circulator 246. In turn, second port 246b of second HEU optical circulator 246 is optically coupled to first end 248 of the at least one optical fiber 222. Third port 244c of multiport HEU optical coupler 244 is optically coupled to second HEU laser 250. Second HEU laser 250 may be, for example, a vertical cavity surface emitting laser (VCSEL) diode.

Third port 246c of HEU optical circulator 246 is optically coupled to HEU photodetector 252 that is electrically coupled to third HEU amplifier 254. The output of third HEU amplifier 254 is electrically coupled to third port 232c of HEU electrical circulator 232 through second HEU bandpass filter 257.

Figure 9:
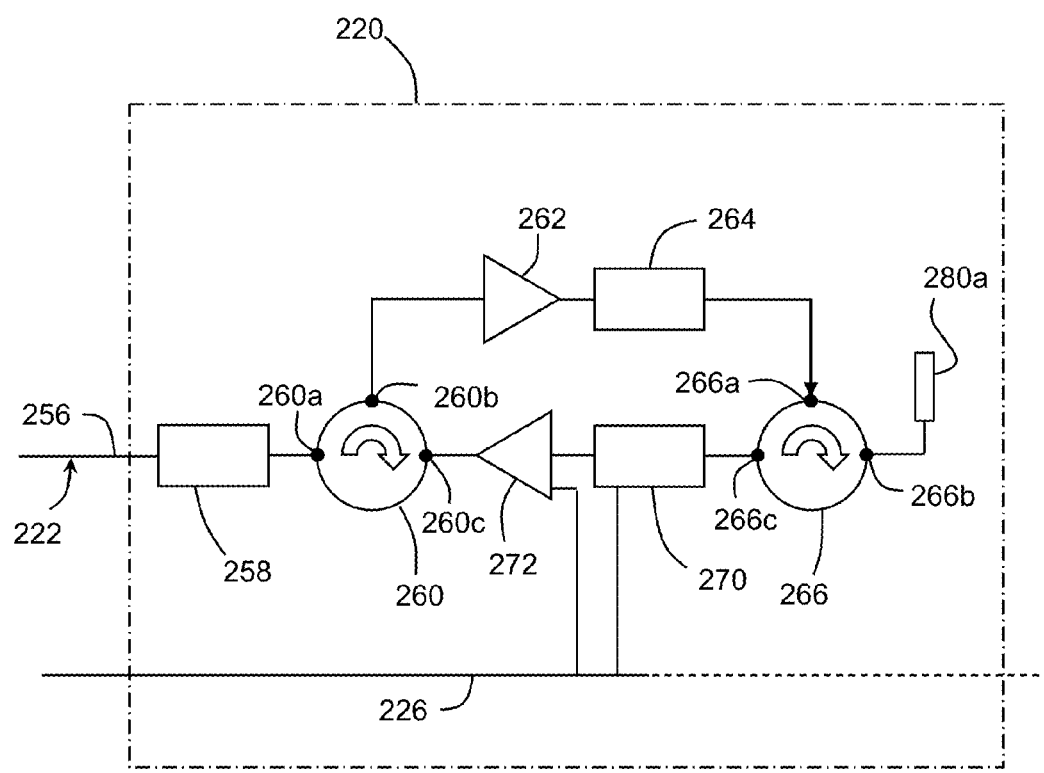
FIG. 9 is a detailed schematic diagram of the remote antenna unit (RAU) of the communication cable of FIG. 6.

Referring now to FIG. 9, RAU 220 comprises reflective, electro-absorption modulator (R-EAM) 258. RAU 220 may further comprise a duplexer, e.g. first RAU electrical circulator 260 comprising first, second and third ports 260a, 260b and 260c, respectively. Second end 256 of the at least one optical fiber 222 is optically coupled to reflective, electro-absorption modulator (R-EAM) 258, which in turn is electrically coupled to first port 260a of first RAU electrical circulator 260. Second port 260b of first RAU electrical circulator 260 is electrically coupled to first RAU amplifier 262, which in turn is electrically coupled to first RAU bandpass filter 264.

RAU 220 may further comprise a second duplexer, e.g. RAU electrical circulator 266 comprising first, second and third ports 266a, 266b and 266c, respectively. The output of first RAU bandpass filter 264 is electrically coupled to first port 266a of second RAU electrical circulator 266. Second port 266b of second RAU electrical circulator 266 is electrically coupled to RAU electromagnetic coupler 280a. In addition, third port 266c of second RAU electrical circulator 266 is electrically coupled to the input of second RAU bandpass filter 270. The output of second RAU bandpass filter 270 is in turn electrically coupled to third port 260c of first RAU circulator 260 through second RAU amplifier 272.

FIGS. 7 and 9 further illustrate electrical conductor 226 extending between HEU 218 and RAU 220. To simplify FIG. 2, electrical conductor 226 is shown unconnected to selected components within HEU 218 or RAU 220. However, it should be noted that electrical conductor 226 may be connected to any component within HEU 218 or RAU 220 requiring electrical power. For example, electrical conductor 226 may serve as an electrical supply line to which electrical or electronic components within HEU 218 and/or RAU 220 may be electrically coupled. Electrical conductor 226 may be energized via direct electrical contact with one or more components of host device 216, or electrical conductor 226 may be energized electromagnetically. For example, an electrical coil within host 216 can be used to develop an electromagnetic field that energizes a corresponding electrical coil within HEU 218 (not shown), wherein the electrical coil within HEU 218 is in electrical communication with electrical conductor 226. DC current can be developed within HEU 218 using suitable rectifier circuitry. Alternatively, electrical power can be via near field power transmission.

In one example, where information is to be communicated from host device 216 to client device 214, host device 216, such as a computer, generates a radio frequency signal that is directed through electrical signal line 210 to the first port 232a of first HEU electrical circulator 232. The electrical RF signal is passed by first HEU electrical circulator 232 to first HEU amplifier 234, where the RF signal is amplified by first HEU amplifier 234 and subsequently filtered by first HEU bandpass filter 238 to remove electrical noise. The output of first HEU bandpass filter 238 is transmitted to second HEU amplifier 236. Second HEU amplifier 236 is a driver amplifier that is electrically coupled to HEU modulator 242. HEU modulator 242 receives an optical carrier light from first HEU laser diode 240 that is amplitude modulated by the RF signal received from second HEU amplifier 236, via HEU modulator 242, thereby converting the electrical RF signal from second HEU amplifier 236 to an optical RF signal. The optical RF signal from HEU modulator 242 is directed to first port 244a of RAU optical coupler 244. The optical RF signal RAU optical coupler 244 is then directed from second port 244b of RAU optical coupler 244 to first port 246a of second HEU optical circulator 246, which passes the optical RF signal to the at least one optical fiber 222 via second port 246b of second HEU optical circulator 246, where the optical RF signal is then transmitted to RAU 220.

The optical RF signal transmitted through the at least one optical fiber 222 is received by reflective electro-absorption modulator (R-EAM) 258. R-EAM 258 converts the optical RF signal to an electrical RF signal and directs the electrical RF signal to first RAU electrical circulator 260 via port 260a. From first RAU circulator 260 the electrical RF signal is directed through first RAU amplifier 262, first RAU bandpass filter 264 and second RAU electrical circulator 266. Second RAU electrical circulator 266 in turn directs the electrical RF signal to RAU EM coupler 280a that is in electromagnetic near field communication with a corresponding coupler within client device 216.

For communication from client device 214 to host device 216, the signal transition proceeds as follows. An electrical RF signal generated by client device 214 is received by RAU electromagnetic coupler 280a from electro-magnetic coupler 280b of client device 214. The electrical RF signal generated within electromagnetic coupler 280a is directed through second port 266b of second RAU circulator 266 to second RAU amplifier 272 through second RAU bandpass filter 270. Second RAU amplifier 272 in turn feeds the electrical RF signal to third port 260c of first RAU electrical circulator 260, where the electrical RF signal is directed from first port 260a to R-EAM 258. In the meantime, second HEU laser diode 250 generates a second optical carrier light that is routed to third port 244c of multiport coupler 244, and then from second port 244b of multiport coupler 244 to first port 246a of HEU optical circulator 246. The second optical carrier light is then output from second port 246b of HEU optical circulator 246 onto the at least one optical fiber 222. The second optical carrier light arrives at R-EAM 258 from the at least one optical fiber 222. R-EAM 258 modulates the second optical carrier according to the electrical RF signal received from second RAU amplifier 272, and reflects the now RF modulated second optical carrier back through the at least one optical fiber 222 to second port 246b of second HEU optical circulator 246. The RF-modulated second optical carrier is directed by second HEU optical circulator 246 through third port 246c to HEU photodiode 252 and converted to an RF electrical signal. The RF electrical signal is received from HEU photodiode 252 by third HEU amplifier 254 and directed to third port 232c of first HEU electrical circulator 232 through second HEU bandpass filter 257. The electrical RF signal is then directed through first port 232a of HEU electrical circulator 232 to host device 216 through direct physical and electrical contact over electrical signal line 210.

Figure 10:
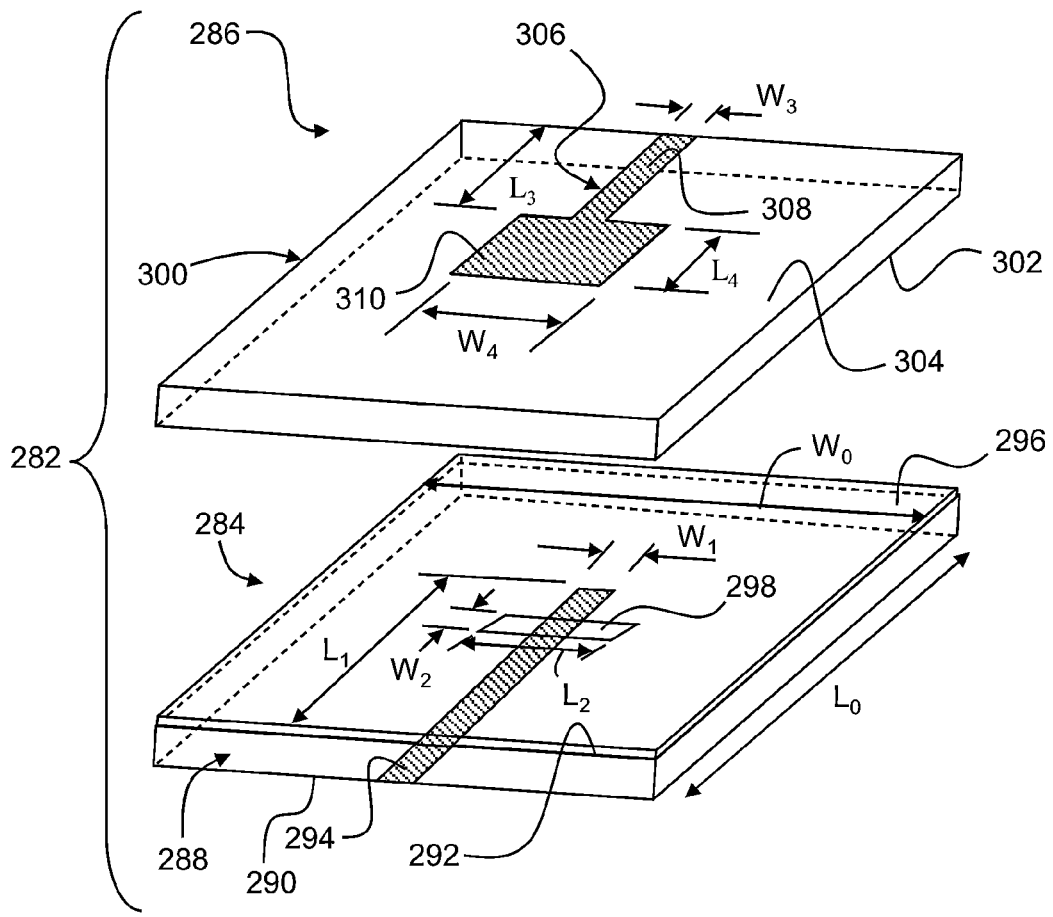
FIG. 10 is a perspective view of an electromagnetic (EM) coupler circuit useable with the communication cable of FIG. 6, showing component EM couplers.

Referring now to FIG. 10, a signal coupling circuit 282 (split patch circuit) suitable for use as an antenna component for embodiments described herein is shown. Signal coupling circuit 282 comprises a first EM coupler 284 and a second EM coupler 286. First EM coupler 284 comprises a first substrate 288 having first major surface 290 and second major surface 292 disposed substantially parallel to first major surface 290. First substrate 288 can have a thickness equal to or less than about 500 μm, equal to or less than about 300 μm, or equal to or less than about 100 μm. First substrate 288 may be formed from an electrically insulating material or a dielectric material. First EM coupler 284 comprises a width $W_0$ and a length $L_0$. In one example, width $W_0$ is in a range from about 1500 μm to about 2500 μm, for example 2000 μm. In one example, length $L_0$ is in a range from about 3500 μm to about 4500 μm, for example 4000 μm. First substrate 288 comprises an electrically conductive layer 294, disposed on first major surface 290 as a narrow strip. Electrically conductive layer 294 comprises a length $L_1$ and a width $W_1$, and an aspect ratio of electrically conductive layer 294 defined as length divided by width ($L_1/W_1$) may, in some examples, be equal to or greater than 2, equal to or greater than 4, equal to or greater than 6, equal to or greater than 8 or even equal to or greater than 10. Accordingly, conductive layer 294 will be referred to hereinafter as conductive strip 294. Conductive strip 294 terminates on first substrate 284. In one example, electrically conductive strip 294 has a width $W_t$ in a range from about 150 μm to about 250 μm, for example 206 μm. In one example, electrically conductive strip 292 further comprises a length $L_1$ on dielectric substrate 288 in a range from about 2200 μm to about 2300 μm, for example 2260 μm.

First substrate 288 further comprises a second electrically conductive layer 296 that serves as a ground plane disposed on second major surface 292 of substrate 288, and which second electrically conductive layer is hereinafter referred to as ground plane 296. Ground plane 296 covers substantially all of second major surface 292, such as greater than about 75% of second major surface 292, except that ground plane 296 comprises aperture 298 defined by ground plane 296 that is an opening through ground plane 296 so that at least a portion of second major surface 292 is exposed through aperture 298. Aperture 298 comprises a rectangular aperture having a length $L_2$ and a width $W_2$, and is positioned such that the long dimensions of electrically conductive strip 294 and aperture 298 (i.e. $L_1$ and $L_2$, respectively, are orthogonal). An aspect ratio $L_2/W_2$ of aperture 298 is preferably equal to or greater than 2, equal to or greater than about 2.5, equal to or greater than 3, or even equal to or greater than 3.5. In one example, aperture 298 has a width $W_2$ in a range from about 125 μm to about 225 μm, for example 174 μm. In one example, aperture 298 comprises a length $L_2$ in a range from about 600 μm to about 700 μm, for example 634 μm. It should be noted that the dimensions and aspect ratios of conductive strip 294 and aperture 298 will be dictated by the operating frequency of the RF signal for which the coupler will be utilized.

Signal coupling circuit 282 may further comprise second EM coupler 286 comprising second substrate 300. Second substrate 300 may be formed from an electrically insulating material or a dielectric material, and in some examples has a width and a length substantially equal to the width and length of first substrate 288, $W_0$ and $L_0$, respectively. Second substrate 300 comprises first major surface 302 and second major surface 304 disposed parallel to first major surface 300. Second substrate 288 can have a thickness between first and second major surfaces 302 and 304 equal to or less than about 500 μm, equal to or less than about 300 μm, or equal to or less than about 100 μm. In accordance with FIG. 10, second major surface 304 comprises an electrically conductive layer 306 disposed thereon. Electrically conductive layer 306 comprises a strip portion 308 having a length $L_3$ and a width $W_3$ and a high aspect ratio, and a pad portion 310 having a length $L_4$ and a width $W_4$ and a low aspect ratio. The overall length of conductive layer 306 is the sum of the lengths of the strip portion and the pad portion, i.e. $L_3+L_4$. In one example, strip portion 308 comprises a length $L_3$ in a range from about 1200 μm to about 1300 μm, for example, 1269 μm. In one example, strip portion 308 may have a width $W_3$ in a range from about 150 μm to about 250 μm, for example, 206 μm. In some examples, pad portion 310 may have a length $L_4$ in a range from about 1000 μm to about 1100 μm, for example 1062 μm. In some examples, pad portion 310 may have a width $W_4$ in a range from about 1000 μm to about 1100 μm, for example 1062 μm. Strip portion 308 may have an aspect ratio $L_3/W_3$ equal to or greater than 2, equal to or greater than 4, equal to or greater than 5, or even equal to or greater than 6. An aspect ratio $L_4/W_4$ of pad portion 310 may be in range from about 0.5 to about 1.5, for example about 1. Strip portion 308 and pad portion 310 are in electrical communication, and are preferably contiguous, being formed from the same material.

In use, signal coupling circuit 382 is arranged so that electrically conductive layer 296 (ground place 296) is positioned adjacent to and substantially parallel with first major surface 302 of substrate 286. The distance between first major surface 302 and electrically conductive layer 396 is preferably sufficiently small that an electrical RF signal supplied to electrically conductive layer 296 (306) is coupled to the opposing electrically conductive layer 306 (294) in the near field of the electromagnetic field produced by the applied electrical RF signal. For example, the distance between first major surface 302 and ground plane 296 may be equal to or less than 10 μm, equal to or less than 5 μm, or equal to or less than 1 μm. For example, the distance between first major surface 302 and ground plane 296 may be less than about 2 wavelengths of the carrier. In some examples, first major surface 302 and ground plane 296 can be in direct contact. Substrates 284 are positioned such that pad portion 308 is adjacent to and opposite aperture 298. It should be noted that separation distanced between ground plane 296 and first major surface 302 is influenced by the operating frequency of the RF signal, such that the separation distance can be greater than 10 μm, for example, less than or equal to about 10 cm, less than or equal to about 2 cm, or less than or equal to about 500 μm.

As utilized herein, RAU EM coupler 280a may comprise first EM coupler 284 or second EM coupler 286. For example, if RAU EM coupler 280a comprises first EM coupler 284 (wherein the strip 294 is electrically coupled to second RAU electrical circulator 266), client device 214 can comprise second EM coupler 286 (wherein the electrically conductive layer 306 is electrically coupled within client device 214). Conversely, if RAU EM coupler 280a comprises second EM coupler 286 (wherein the electrically conductive layer 306 is electrically coupled with second RAU electrical circulator 266), client device 214 can comprise first EM coupler 284. In either case, when RAU 220 is brought into proximity with client device 214 such that an RF signal is electromagnetically coupled in the near field between first EM coupler 284 and second EM coupler 286, an RF signal may pass between the two EM couplers in the electromagnetic near field.

Figure 11:
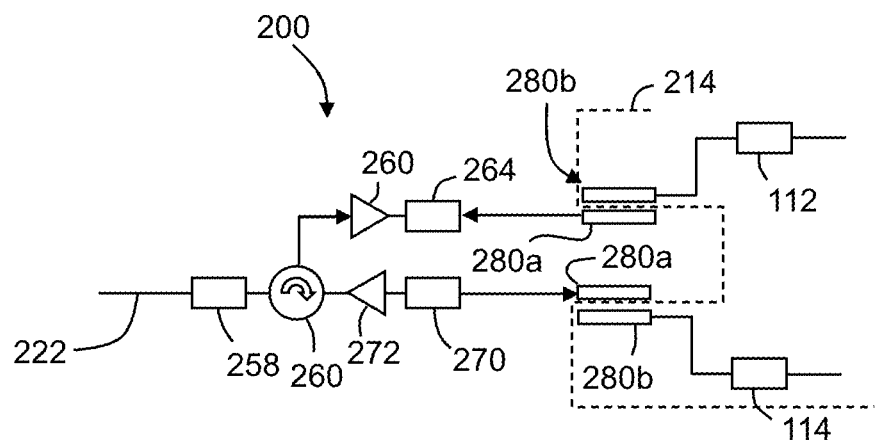
FIG. 11 is a detailed schematic diagram of an alternative embodiment RAU for use with the communication cable of FIG. 6.

In one aspect of the embodiment of FIGS. 6-7, shown in FIG. 11, RAU 220 may comprise two EM couplers, i.e. 280a (wherein each electromagnetic coupler 280a may comprise EM coupler 284 or 286). A first EM coupler 280a is configured to transmit, and a second EM coupler 280a is configured to receive in a duplex arrangement. EM couplers 280a are, accordingly, in EM communication with a pair of corresponding EM couplers 280b. EM couplers 280b may comprise, for example, EM couplers 284 and/or 286. Conversely, client device 214 also includes two EM couplers, i.e. 280b (wherein each EM coupler 280b may comprise EM coupler 284 or 286). The embodiment of FIG. 11 shows a schematic of such an aspect, wherein second RAU electrical circulator 266 shown in FIG. 8 can therefore be eliminated, leading to a space saving in RAU 220 and therefore a smaller form factor. In accordance with the present embodiment, client device 214 comprises a transmitting circuit 112 configured to operate at an appropriate RF frequency, e.g. 60 GHz, and a receiving circuit 114 configured to receive at the appropriate RF frequency, e.g. 60 GHz.

Figure 12:
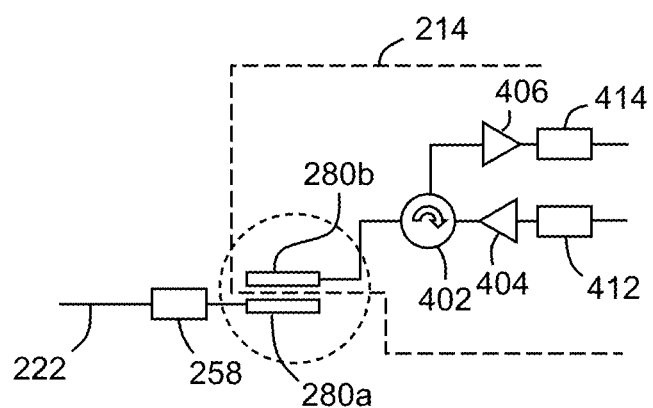
FIG. 12 is a detailed schematic diagram of another alternative embodiment RAU for use with the communication cable of FIG. 6.

In another aspect of the embodiment of FIGS. 6-7, shown in FIG. 12, RAU 220 comprises only R-EAM 258 and EM coupler 280a (or 280b). All physical layer multiplexing and amplification functions are removed from the RAU and placed inside the client device 214 so that multiplexing of the up/downlink RF signal is performed using software and hardware protocols provided by client device 214, e.g. frequency division multiplexing (FDM) protocols or time division duplex protocols. Accordingly, client device 214 comprises electrical circulator 402, amplifiers 404 and 406 and separate transmitter 412 and receiver 414 configured to operate at an appropriate RF frequency, e.g. 60 GHz. FIG. 12 shows a schematic of such an aspect.

Figure 13:
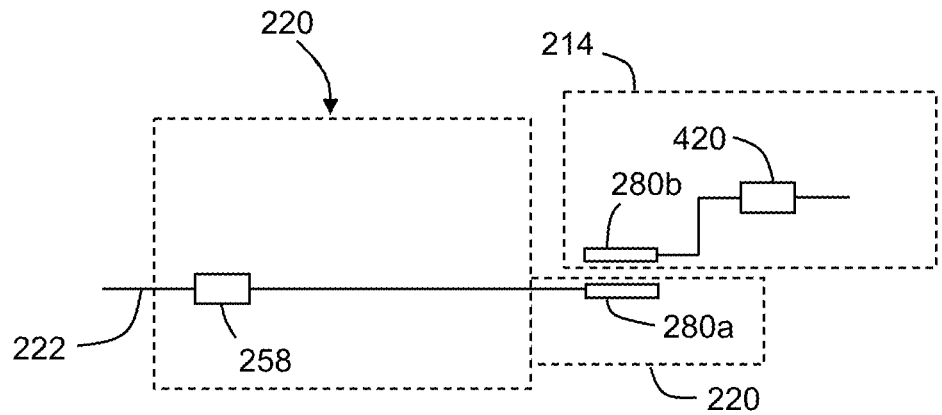
FIG. 13 is a detailed schematic diagram of still another alternative embodiment of an RAU for use with the communication cable of FIG. 6.

In another aspect of the embodiment of FIGS. 6-7, the RF chain at the RAU end may be simplified further by eliminating physical layer multiplexing (circulator, etc.) altogether and using the appropriate transmission protocol to achieve the required up/downlink multiplexing as shown in FIG. 13. Accordingly, RAU 220 comprises only R-EAM 258 and electromagnetic coupler 280a (or 280b). Multiplexing of the up/downlink signal is performed using software and hardware protocols provided by client device 214, e.g. frequency division multiplexing (FDM) protocols or time division duplex protocols. Accordingly, client device 214 comprises transceiver 420 configured to operate at an appropriate RF frequency, e.g. 60 GHz. Transceiver 420 is configured to both transmit and receive an RF modulated electrical signal, and is electrically coupled to EM coupler 280b (or 280a) within client device 214. FIG. 13 shows a schematic of such an aspect, wherein second electrical RAU circulator 266 shown in FIG. 8 can be eliminated, leading to a space saving in the RAU and a smaller form factor.

Figure 14:
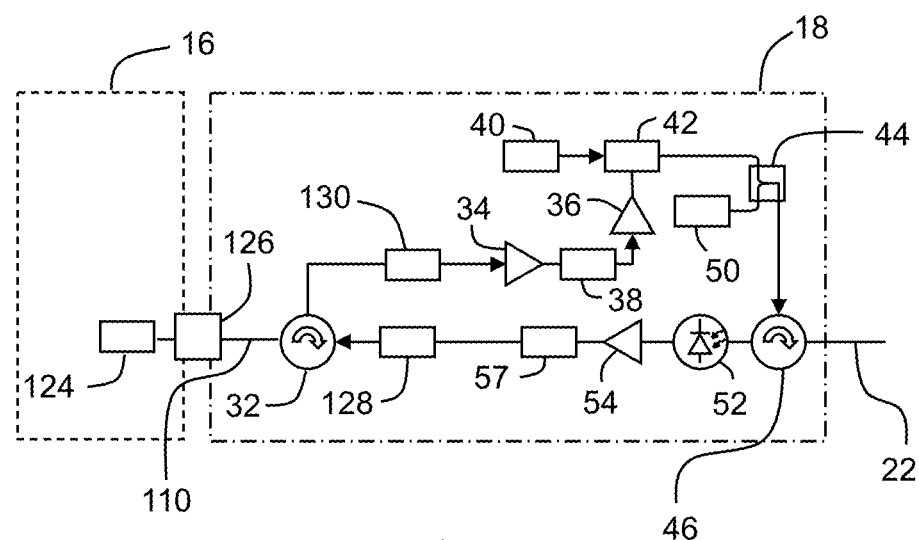
FIG. 14 is a detailed schematic diagram of an alternative embodiment of an HEU for use with the communication cable of FIG. 5.

In another aspect of the embodiment of FIG. 2, the RF transceiver functions and physical multiplexing may be moved from host device 16 into HEU 18. As shown in FIG. 14, baseband transceiver circuitry 124 transmits an RF electrical signal to HEU 18 over signal transmission line 110, wherein HEU 18 and host device 16 (e.g. baseband transceiver 124) may be directly electrically connected, such as through mated connectors. Block 126 represents mated connectors comprising HEU 18 and host device 16, such that the mated connectors form a direct electrical connection between HEU 18 and host device 16. Transmitter circuitry 128 is positioned within HEU 18 between HEU electrical circulator 32 and second HEU bandpass filter 72, and receiver circuitry 130 is positioned within HEU 18 between HEU electrical circulator 32 and first HEU amplifier 34. Accordingly, baseband transmission over the host cable interface simplifies the contact technology.

Figure 15:
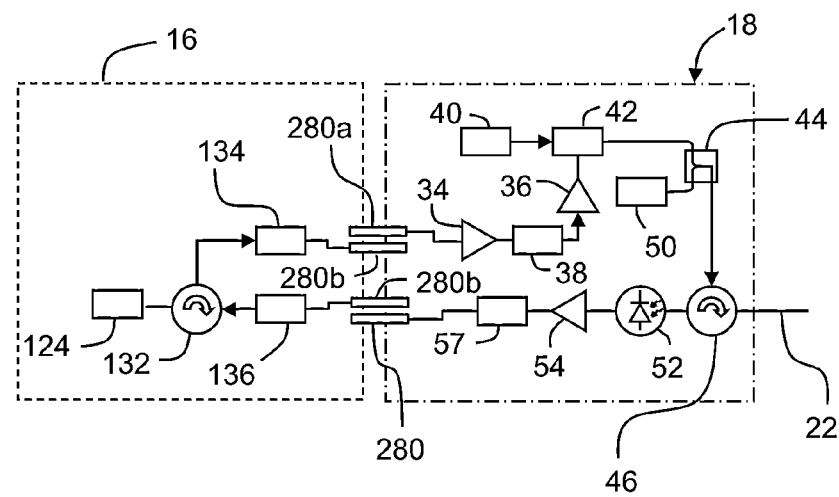
FIG. 15 is a detailed schematic diagram of another alternative embodiment of an HEU for use with a communication cable according to the present disclosure.

In yet another aspect, shown in FIG. 15, multiple electromagnetic couplers may be employed between HEU 18 and host device 16. As shown in FIG. 15, baseband transmission and reception is performed by appropriate circuitry within host device 16, which further includes an electrical circulator 132 and separate transmitter 134 and receiver 136. Transmitter 134 is electrically coupled to a first EM coupler 280b, and receiver 136 is electrically coupled to a second EM coupler 280b. Accordingly, HEU 18 includes corresponding EM couplers, a first HEU EM coupler 280a that communications with first host device electromagnetic coupler 280b in the electromagnetic near field, and a second HEU EM coupler 280a that communicates with another host EM coupler 280b in the electromagnetic near field. Configuration of FIG. 15 allows for a reduction in the components comprising HEU 18 by eliminating the need for first electrical circulator 32 shown in FIG. 2.

Figure 16:
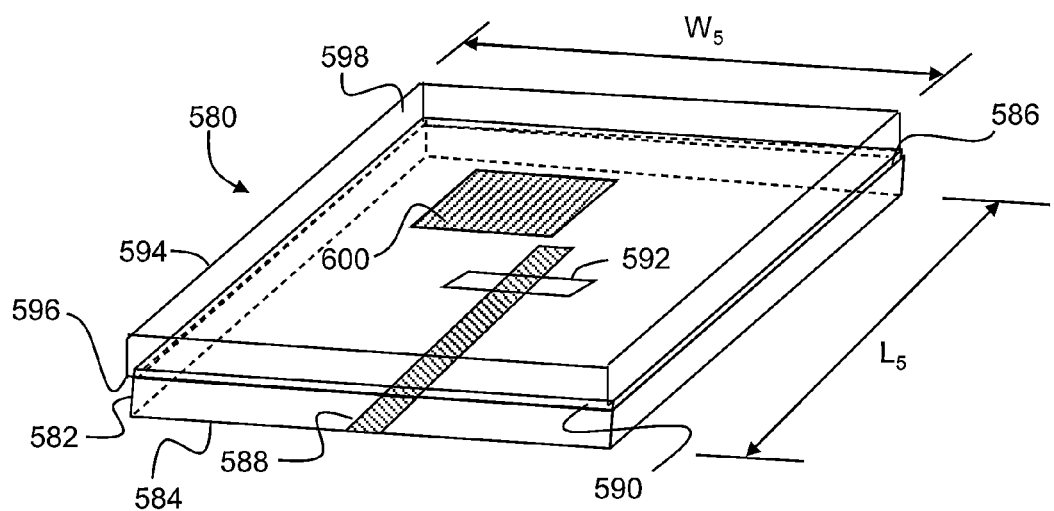
FIG. 16 is a perspective view of an EM coupler for use with embodiments of communication cables disclosed herein.
Figure 17:
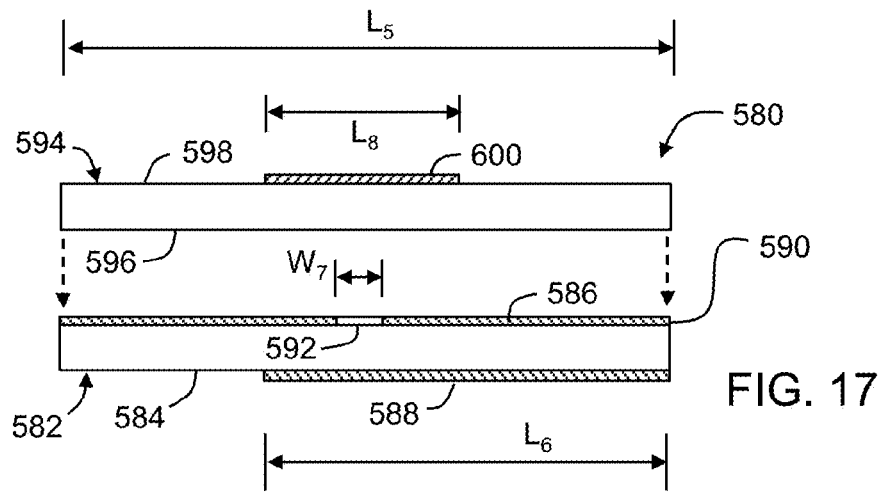
FIG. 17 is a side cross sectional view of the EM coupler of FIG. 16.
Figure 18:
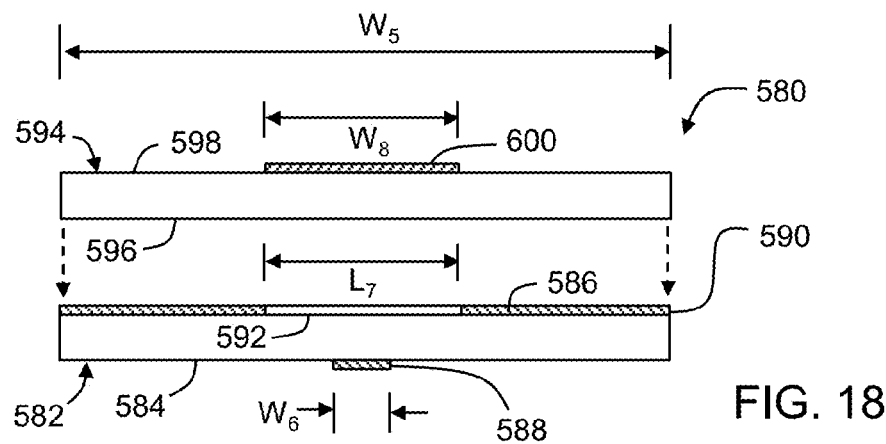
FIG. 18 is a side cross sectional view of the EM coupler of FIG. 16 as seen rotated 90 degrees from the view of FIG. 17.

Referring now to FIGS. 16-18, an alternative EM coupling unit 580 is shown according to one embodiment. EM coupler 580 comprises a first substrate 582 having first major surface 584 and second major surface 586 disposed parallel to first major surface 584. A thickness between the first and second major surfaces may be equal to or less than about 500 μm, equal to or less than about 300 μm, or equal to or less than about 100 μm. In some examples, the thickness between the first and second major surfaces is about 135 μm. First substrate 582 may be formed from an electrically insulating material or a dielectric material. First substrate 582 comprises a width $W_5$ and a length $L_5$. In one example, width $W_5$ is in a range from about 1500 μm to about 2500 μm, for example 2000 μm. In one example, length $L_5$ is in a range from about 3500 μm to about 4500 μm, for example 4000 μm.

First major surface 584 comprises an electrically conductive layer 588, disposed thereon as a narrow strip. Electrically conductive layer (strip) 588 comprises a length $L_6$ and a width $W_6$, and an aspect ratio of electrically conductive layer 588 defined as length divided by width ($L_6/W_6$) may, in some examples, be equal to or greater than 2, equal to or greater than 4, equal to or greater than 6, equal to or greater than 8 or even equal to or greater than 10. Accordingly, conductive layer 588 will be referred to hereinafter as conductive strip 588. Conductive strip 588 terminates on first substrate 582. In one example, electrically conductive strip 588 has a width $W_6$ in a range from about 150 μm to about 250 μm, for example 206 μm. In one example, electrically conductive strip 588 further comprises a length $L_6$ on dielectric substrate 586 in a range from about 2200 μm to about 2300 μm, for example 2260 μm.

First substrate 582 further comprises an electrically conductive layer 590 that serves as a ground plane disposed on second major surface 586 of first substrate 582, and which is hereinafter referred to as ground plane 590. Ground plane 590 covers substantially all of second major surface 586, such as greater than about 75% of second major surface 586, except that ground plane 590 comprises aperture 592 defined by ground plane 590 that is an opening through ground plane 590 so that at least a portion of second major surface 586 is exposed through aperture 592. Aperture 592 comprises a rectangular aperture having a length $L_7$ and a width $W_7$, and is positioned such that the long dimensions of conductive strip 588 and aperture 592 ($L_6$ and $L_7$, respectively) are orthogonal. An aspect ratio $L_7/W_7$ of aperture 592 is preferably equal to or greater than 2, equal to or greater than about 2.5, equal to or greater than 3, or even equal to or greater than 3.5. In one example, aperture 592 has a width $W_7$ in a range from about 125 μm to about 225 μm, for example 174 μm. In one example, aperture 592 comprises a length $L_7$ in a range from about 600 μm to about 700 μm, for example 634 μm.

EM coupling unit 580 further comprises second substrate 594. Second substrate 594 may be formed from an electrically insulating material or a dielectric material, and in some examples has a width and a length substantially equal to the width and length of first substrate 582, $W_5$ and $L_5$, respectively. A thickness between the first and second major surfaces may be equal to or less than about 500 μm, equal to or less than about 300 μm, or equal to or less than about 100 μm. In some examples, the thickness between the first and second major surfaces is about 135 μm. Second substrate 594 comprises first major surface 596 and second major surface 598 disposed parallel to first major surface 596. In accordance with FIG. 5, second major surface 598 comprises an electrically conductive layer 600 disposed thereon. Electrically conductive layer 600 is a pad having a length $L_8$ and a width $W_8$ and a low aspect ratio. In one example, electrically conductive layer 600 may have a length $L_8$ in a range from about 1000 μm to about 1100 μm, for example 1062 μm. In one example, electrically conductive layer 600 may have a width $W_8$ in a range from about 1000 μm to about 1100 μm, for example 1062 μm. An aspect ratio $L_8/W_8$ of electrically conductive layer 600 may be in a range from about 0.5 to about 1.5, for example about 1.

FIG. 17 is a cross sectional view of the EM coupler 580 of FIG. 16 as seen edge-on from one edge of the EM coupler, wherein FIG. 18 shows a cross sectional view of the EM coupler 580 of FIG. 16 as seen edge on from another edge of the EM coupler orthogonal to the view of FIG. 17.

Figure 19:
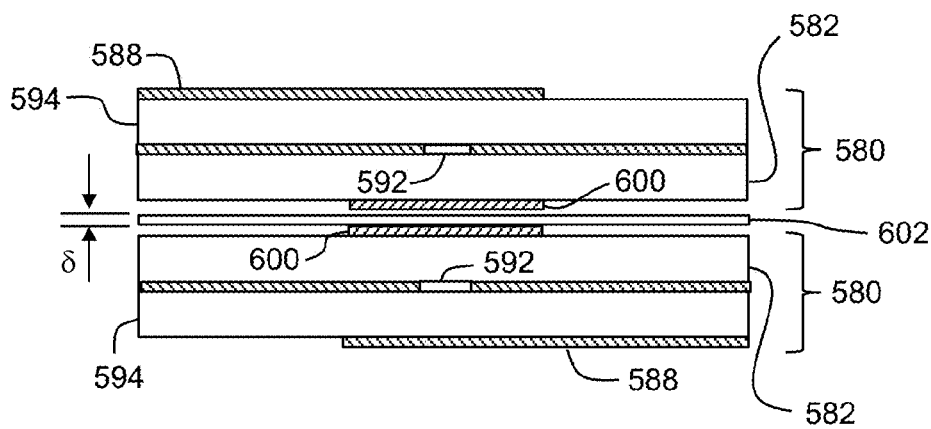
FIG. 19 is a cross sectional view of two EM couplers in close adjacency according to operational embodiments disclosed herein.
Figure 20:
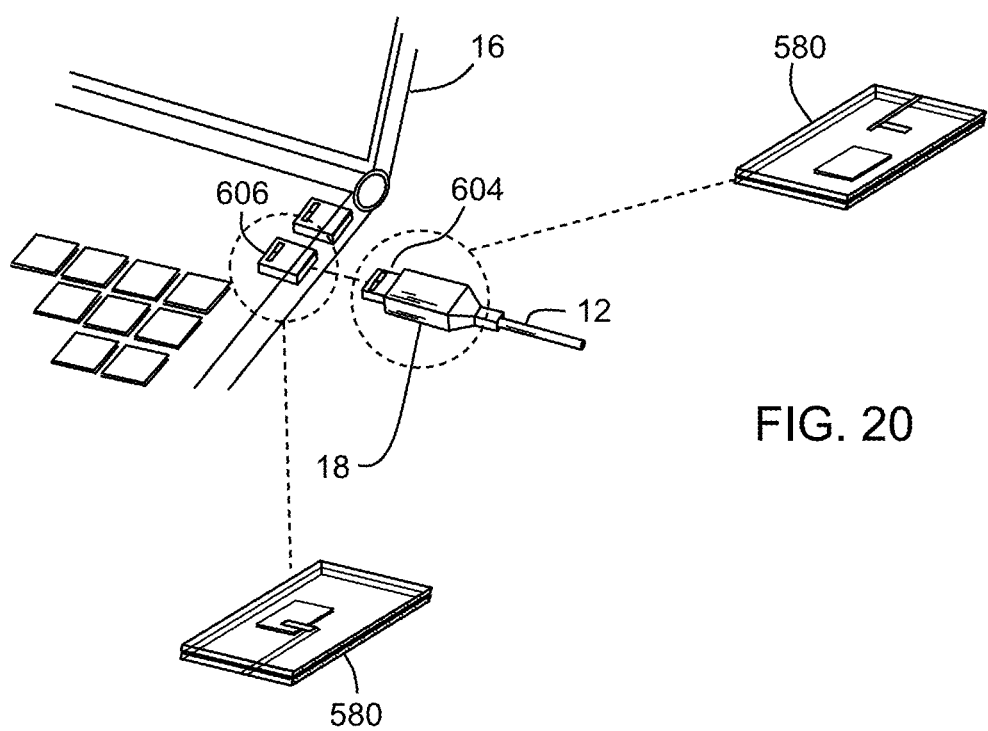
FIG. 20 is a perspective view of a portion of a communication system according to an embodiment disclosed herein, and illustrating a connection arrangement between the cable and a host device.

In an example of use, a first EM coupling unit 580 can be positioned so that electrically conductive layer 600 of the first EM coupler 582 is opposed to and substantially parallel with the electrically conductive layer 600 of a second EM coupler 582, as shown in FIG. 19. The distance δ between the first and second conductive layers 600 is sufficiently small that an electrical RF signal supplied to electrically conductive layer 588 of the first EM coupler 580 is electromagnetically coupled, in the near field of the electromagnetic field produced by the applied electrical RF signal, between the two EM coupling units to the electrically conductive layer 600 of the second EM coupler 580. For example, the distance δ between the electrically conductive layers 600, as illustrated in FIG. 18, can be equal to or less than about 500 mm, equal to or less than about 300 μm, or equal to or less than about 100 μm. An insulating or dielectric material 602 may be positioned between the first and second EM couplers to maintain an appropriate distance between the EM couplers. Material 602 may be glass for example. Alternatively, the distance δ may be an air gap. In some embodiments, the first and/or second EM coupler 580 may be housed in a connector or socket assembly. For example, as shown in FIG. 20, HEU 18 may include a connector housing 604 that plugs into a mating socket assembly 606 comprising host device 16. First and second EM couplers 580 are positioned such that their respective electrically conductive layers 600 are opposite each other, and opposite their respective apertures 592. For example, HEU electromagnetic coupler 68a shown in FIG. 2 may comprise an EM coupler 580. Similarly, EM coupler 68b may also comprise EM coupler 580. Additionally, EM coupler 280a or 280b may comprise EM coupler 580. In either case, when HEU 18 is brought into proximity with host device 16 such that an RF signal is electromagnetically coupled in the near field between a first EM coupler 580 and a second EM coupler 580, an RF signal may pass between the two EM couplers.

It has been observed that the coupling loss for an air gap of up to 500 μm is less than 20 dB over the full 60 GHz band. The coupling loss for a glass substrate 602 having a thickness of 500 μm was under −25 dB. These coupling losses are lower than those in examples employing split patch EM coupling, which means a system employing EM couplers 580 has more than enough power budget for greater than 21 Gbps signal transmission. The difference in the link response between split patch EM coupling and EM coupling utilizing couplers 580 with air separation is that the resonance frequency in the latter case is around 56 GHz, which is closer to the 60 GHz band. This in turn results in a 10 dB roll-off in the coupling response over the 60 GHz band. This would be no problem for multi-carrier signal modulation formats such as Orthogonal Frequency Division Multiplexing (OFDM), which are designed for such conditions. For single-carrier modulation formats simple signal equalization could easily be utilized within the baseband signal processing unit in host device 16 to compensate for the roll-off in the response of the communication link. The response of the link has been shown to be extremely flat when glass is used as the dielectric between the two couplers 580.

Figure 21:
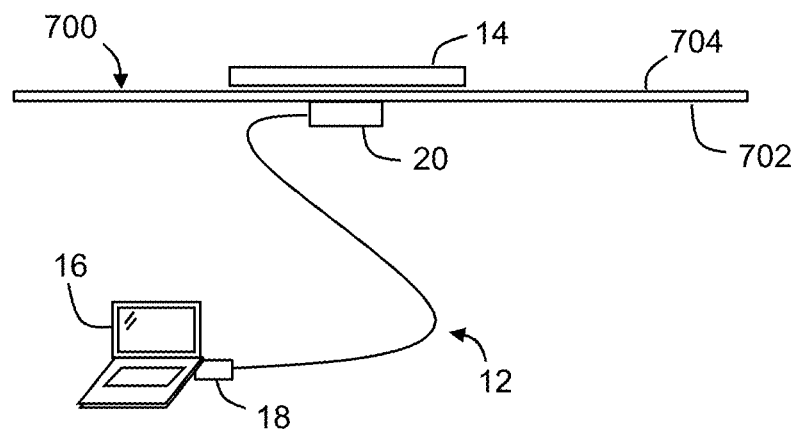
FIG. 21 is a schematic view of a near field communication system wherein a remote antenna unit (RAU) of an electro-optical link as described herein is positioned adjacent to a substrate, e.g. a table top, and wherein the opposite head end unit (HEU) of the electro-optical cable is directly coupled to a host device.
Figure 22:
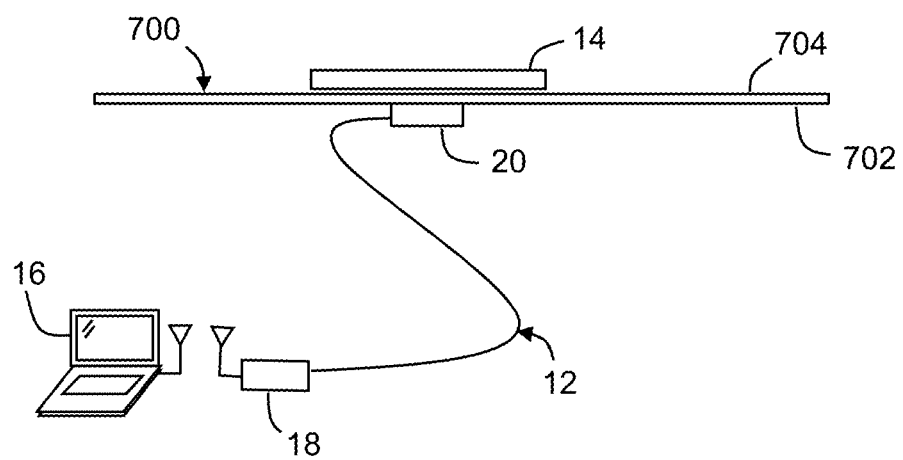
FIG. 22 is a schematic view of a near field communication system wherein a remote antenna unit (RAU) of an electro-optical link as described herein is positioned adjacent to a substrate, e.g. a table top, and wherein the opposite head end unit (HEU) of the electro-optical cable is electromagnetically coupled to a host device wirelessly.
Figure 23:
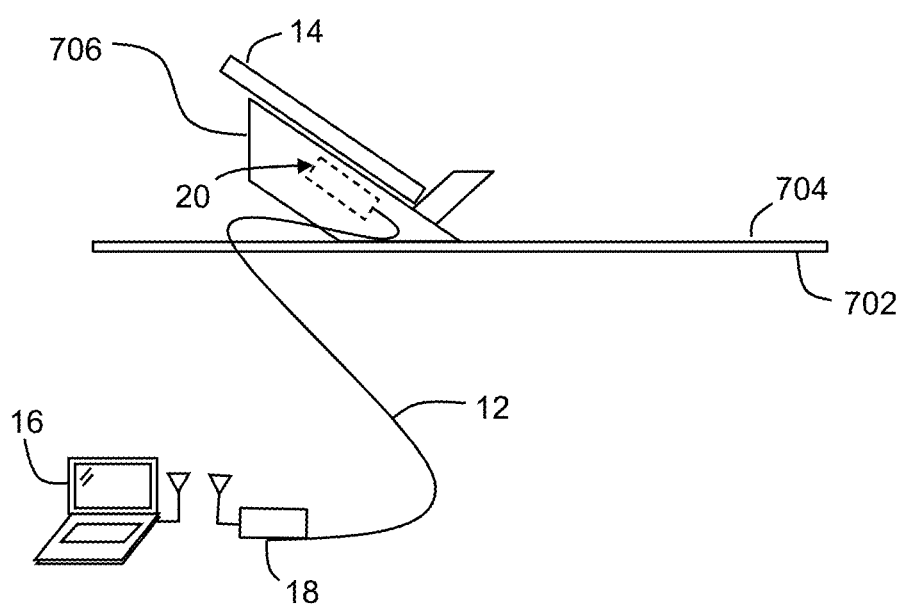
FIG. 23 is a schematic view of a near field communication system wherein a remote antenna unit (RAU) of an electro-optical link as described herein is positioned within a docking fixture configured to hold a client device, and wherein the opposite head end unit (HEU) of the electro-optical cable is electromagnetically coupled to a host device wirelessly.

Several additional applications of embodiments described herein are illustrated in FIGS. 21 and 22. For example, FIG. 21 illustrates a substrate 700 wherein a RAU 20 is positioned adjacent to a first side 702 of the substrate. Substrate 700 may, for example, be an insulating or dielectric material. In some embodiments, substrate 700 may be a glass or plastic sheet. For example, substrate 700 may represent a table top, or a surface covering of a table or other furniture or appliance. In one embodiment, substrate 700 is a plate or sheet of glass arranged as the outer surface of a table or appliance, wherein RAU 20 is positioned adjacent a surface of the plate or sheet of glass opposite the outward facing surface 704. In an alternative embodiment, RAU 20 may be embedded within the substrate 700, or positioned so as to be at least partially exposed on the outward facing surface 704. In further detail, HEU 18 may be coupled to a host device 16, wherein as described above, RAU 20 and HEU 18 are connected through at least one optical fiber contained within cable 12. Simply described, substrate 700 may comprise a surface of a piece of furniture, e.g. table top, or an appliance (e.g. the front surface of a refrigerator), wherein a client device 14 brought into close proximity of a predetermined portion of the surface (such that the client device is in close proximity of RAU 20 positioned on, in or beneath the substrate) can communication with a host device coupled to the HEU of the cable 12. For example, in some embodiments, a user might place their client device (e.g. "smartphone" comprising advanced computing capability, connectivity, and functionality including media players, image capturing, GPS navigation, etc.) on a designated location on a table top configured as above, and have data from the client device transferred from the client device to a processing unit remote from the cell phone as described herein without physical connection between the client device and the electro-optical cable 12. In some embodiments, the substrate can be combined with a visual display unit, such as an LCD display, so that data (e.g. images) from the client device may be displayed on the substrate via the display unit. The substrate may comprise a portion of the display, or the display may be positioned adjacent to the substrate, such as beneath the substrate relative to the user/viewer. In some embodiments, substrate 700 may comprise other surfaces, such as a wall surface, or substrate 700 may be mounted on a wall surface.

FIG. 22 illustrates an alternative embodiment from the one depicted in FIG. 21, wherein coupling between HEU 18 and host device 16 is wireless rather than a direct connection depicted in FIG. 21.

In other embodiments, electro-optical cable 12 may be coupled to a docking fixture 706 so that the client device may be securely cradled or held, as shown in FIG. 22. In still other embodiments, electro-optical cable 12 may be combined with a docking fixture without the need for a glass and/or plastic substrate. For example, a docking fixture may be a movable fixture that can be placed on a piece of household furniture in one room (e.g. table or desk), and wherein the electro-optical cable couples a client device placed within or on the docking fixture to a host device remotely located from the cradle. The cable RAU 20 included within the docking fixture communicates with the client device 14 in the near field, and transmits the received data to the host device 16 through the one or more optical fibers 22. A docking fixture may be used, for example, in vehicles, where electro-optical cable 12 couples a client device within the vehicle to an on-board host device within the vehicle.

It should be understood that the preceding application may be employed with any of the embodiments of an electro-optical cable as described within the present disclosure.

It will be apparent to those skilled in the art that various other modifications and variations can be made to embodiments of the present disclosure without departing from the spirit and scope of the disclosure. Thus it is intended that the present disclosure cover the modifications and variations of the described embodiments provided they come within the scope of the appended claims and their equivalents.

What is claimed is:

1. A communication link for communicating between a host device and a client device remote from the host device, the communication link comprising:
    at least one optical fiber comprising a first terminal end and a second terminal end;
    a head end unit optically coupled to the at least one optical fiber at the first terminal end, the head end unit comprising a first electro-optic converter configured to convert a received optical signal into an electrical signal or vice versa; and
    a remote antenna assembly comprising a second electro-optic converter that converts a received optical signal into an electrical signal or vice versa,
    wherein the remote antenna assembly further comprises an electromagnetic coupler configured to couple electromagnetic energy to the client device in the near field, the electromagnetic coupler comprising:
        a substrate comprising a first surface and a second surface opposite the first surface;
        a conductive ground plane disposed on the first surface of the substrate, the conductive ground plane defining an aperture extending therethrough; and
        a conductive strip disposed on the second surface of the substrate.

2. The communication link according to claim 1, wherein a light source configured to provide an optical carrier light to the remote antenna assembly is positioned in the head end unit.

3. The communication link according to claim 1, wherein the electromagnetic coupler is a microstrip antenna.

4. The communication link according to claim 1, wherein the head end unit further comprises a duplexer.

5. The communication link according to claim 4, wherein the duplexer is a circulator.

6. The communication link according to claim 1, wherein the head end unit further comprises an optical modulator configured to modulate an optical carrier signal in response to a received RF electrical signal.

7. The communication link according to claim 1, wherein the head end unit comprises an electromagnetic coupler configured to couple electromagnetic energy to the host device in the near field.

8. The communication link according to claim 1, wherein:
    the substrate is a non-metallic substrate;
    the ground plane is a metallic ground plane; and the conductive strip is a metallic strip extending substantially parallel with the metallic ground plane.

9. The communication link according to claim 1, wherein the aperture is rectangular, and the conductive strip is orthogonal with an edge of the aperture.

10. The communication link according to claim 1, the remote antenna assembly further comprising a second electromagnetic coupler comprising:
a dielectric substrate comprising a first surface and a second surface opposite the first surface; and
a metallic layer disposed on the first surface of the dielectric substrate, the metallic layer comprising a strip portion and a pad portion contiguous with the strip portion.

11. A method of forming a wireless communication system between a host device and a client device comprising:
providing a communication link comprising a head end unit and a remote antenna assembly, the head end unit and the remote antenna assembly being in optical communication over an optical fiber, the remote antenna assembly comprising an electromagnetic coupler configured to couple electromagnetically with the client device in the near field, wherein the electromagnetic coupler comprises:
a substrate comprising a first surface and a second surface opposite the first surface;
a conductive ground plane disposed on the first surface of the substrate, the conductive ground plane defining an aperture extending therethrough; and
a conductive strip disposed on the second surface of the substrate;
wirelessly receiving with the electromagnetic coupler an RF signal from the client device in the near field;
receiving an optical carrier signal at the remote antenna assembly from the head end unit over the optical fiber;
using the received RF signal to RF modulate the optical carrier signal at the remote antenna assembly;
optically transmitting the RF modulated optical carrier signal over the optical fiber to the head end unit;
converting the RF modulated optical carrier signal to an RF electrical signal; and
transmitting the RF electrical signal to the host device.

12. The method according to claim 11, wherein the step of wirelessly receiving comprises electromagnetic coupling in the electromagnetic near field between the client device and a first transceiver assembly.

13. The method according to claim 11, wherein:
the substrate is a non-metallic substrate;
the ground plane is a metallic ground plane; and
the conductive strip is a metallic strip extending orthogonal to the aperture.

14. The method according to claim 11, the remote antenna assembly further comprising a second electromagnetic coupler comprising:
a dielectric substrate comprising a first surface and a second surface opposite the first surface; and
a metallic layer disposed on the first surface of the dielectric substrate, the metallic layer comprising a strip portion and a pad portion contiguous with the strip portion.

15. The method according to claim 11, wherein the remote antenna assembly comprises a reflective electro-absorption modulator.

16. The method according to claim 11, wherein the remote antenna assembly comprises an electrical circulator.

17. A communication cable for communicating between a host device and a client device remote from the host device, the communications cable comprising:
an optical fiber comprising a first terminal end and a second terminal end;
a head end unit optically coupled to the optical fiber at the first terminal end, the head end unit comprising a first electro-optic converter configured to convert a received optical signal into an electrical signal or vice versa;
a remote antenna assembly comprising a second electro-optic converter that converts a received optical signal into an electrical signal or vice versa, and further comprising an electromagnetic coupler configured to operate at RF frequencies in the near field, the electromagnetic coupler comprising:
a dielectric substrate comprising a first surface and a second surface opposite the first surface; and
a metallic layer disposed on the first surface comprising a strip portion and a pad portion contiguous with the strip portion, wherein a light source configured to provide an optical carrier light to the second electro-optic converter in the remote antenna assembly is positioned in the head end unit.

18. The communication cable according to claim 17, wherein the second electro-optic converter is a reflective electro-absorption modulator.

19. The communication cable according to claim 17, wherein the remote antenna assembly comprises a microstrip antenna.

20. The communication cable according to claim 19, wherein the microstrip antenna comprises a first substrate including a conductive ground plane disposed on a first side of the first substrate, and a conductive strip disposed on a second side of the first substrate opposite the first side, and wherein the conductive ground plane comprises an aperture therethrough, the aperture positioned opposite the conductive strip such that a long dimension of the conductive strip is perpendicular to a long dimension of the aperture.

* * * * *